(12) United States Patent
Gardenfors et al.

(10) Patent No.: US 10,394,331 B2
(45) Date of Patent: Aug. 27, 2019

(54) DEVICES AND METHODS FOR ESTABLISHING A COMMUNICATIVE COUPLING IN RESPONSE TO A GESTURE

(71) Applicant: BlackBerry Limited, Waterloo (CA)

(72) Inventors: Dan Zacharias Gardenfors, Malmö (SE); Mathias Lewin, Rydebäck (SE)

(73) Assignee: BlackBerry Limited, Waterloo, Ontario (CA)

( * ) Notice: Subject to any disclaimer, the term of this patent is extended or adjusted under 35 U.S.C. 154(b) by 234 days.

(21) Appl. No.: 15/205,115

(22) Filed: Jul. 8, 2016

(65) Prior Publication Data

US 2016/0320856 A1    Nov. 3, 2016

Related U.S. Application Data

(63) Continuation of application No. 13/923,811, filed on Jun. 21, 2013, now Pat. No. 9,389,691.

(51) Int. Cl.

| | | |
|---|---|---|
| *G06F 3/01* | (2006.01) |
| *G06F 3/0488* | (2013.01) |
| *G06F 3/0346* | (2013.01) |
| *H04M 1/725* | (2006.01) |
| *H04W 4/02* | (2018.01) |
| *H04W 4/80* | (2018.01) |
| *H04L 29/08* | (2006.01) |
| *G06F 3/14* | (2006.01) |

(52) U.S. Cl.
CPC ............ *G06F 3/017* (2013.01); *G06F 3/0346* (2013.01); *G06F 3/0488* (2013.01); *G06F 3/04883* (2013.01); *G06F 3/14* (2013.01); *H04L 67/10* (2013.01); *H04M 1/7253* (2013.01); *H04W 4/027* (2013.01); *H04W 4/80* (2018.02); *H04M 1/72569* (2013.01); *H04M 2250/64* (2013.01)

(58) Field of Classification Search
CPC ......... H04W 4/80; G06F 3/017; G06F 3/0488
See application file for complete search history.

(56) References Cited

U.S. PATENT DOCUMENTS

| | | | |
|---|---|---|---|
| 8,339,363 B2 | 12/2012 | Krum ...................... | G06F 1/626 345/158 |
| 2006/0256074 A1* | 11/2006 | Krum ..................... | G06F 1/626 345/156 |
| 2007/0124503 A1 | 5/2007 | Ramos et al. ................ | 709/248 |
| 2007/0188323 A1 | 8/2007 | Sinclair et al. | |
| 2007/0213045 A1* | 9/2007 | Hermansson ......... | G06F 1/1613 455/425 |

(Continued)

OTHER PUBLICATIONS

Extended European Search Report from related European Patent Application No. 13173296.8 dated Nov. 11, 2013; 6 pages.

(Continued)

*Primary Examiner* — Li P Sun
(74) *Attorney, Agent, or Firm* — Jose Gutman; Fleit Gibbons Gutman Bongini & Bianco P.L.

(57) ABSTRACT

A method and a device are disclosed, whereby the device can be a first electronic device. The first electronic device is adapted to be coupled to a second electronic device. The method comprises outputting, with the first device, a request to communicatively couple with a second device in response to a gesture performed with the first device. The second electronic device and method of operating it are also disclosed.

9 Claims, 10 Drawing Sheets

(56) References Cited

U.S. PATENT DOCUMENTS

| | | | |
|---|---|---|---|
| 2009/0265470 A1 | 10/2009 | Shen et al. | 709/227 |
| 2010/0073287 A1 | 3/2010 | Park et al. | 345/157 |
| 2010/0156812 A1 | 6/2010 | Stallings | G06F 3/04883 345/173 |
| 2011/0083111 A1 | 4/2011 | Forutanpour | G06F 1/1694 715/863 |
| 2011/0197147 A1 | 8/2011 | Fai | G06F 1/1639 715/753 |
| 2012/0124481 A1 | 5/2012 | Campbell | 715/748 |
| 2012/0198353 A1 | 8/2012 | Lee | G06F 3/017 715/748 |
| 2013/0076645 A1 | 3/2013 | Anantha et al. | |
| 2014/0143738 A1 | 5/2014 | Underwood, IV | H04L 51/38 715/863 |
| 2014/0149859 A1* | 5/2014 | Van Dyken | H04W 4/21 715/702 |
| 2014/0229858 A1 | 8/2014 | Bleker | G06F 3/017 715/753 |

OTHER PUBLICATIONS

European Examination Report Communication Pursuant to Article 94(3) dated Jul. 19, 2018 for European Application No. 13173296.8.
European Examination Report Communication Pursuant to Article 94(3) dated Jan. 17, 2019 for European Application No. 13173296.8.

* cited by examiner

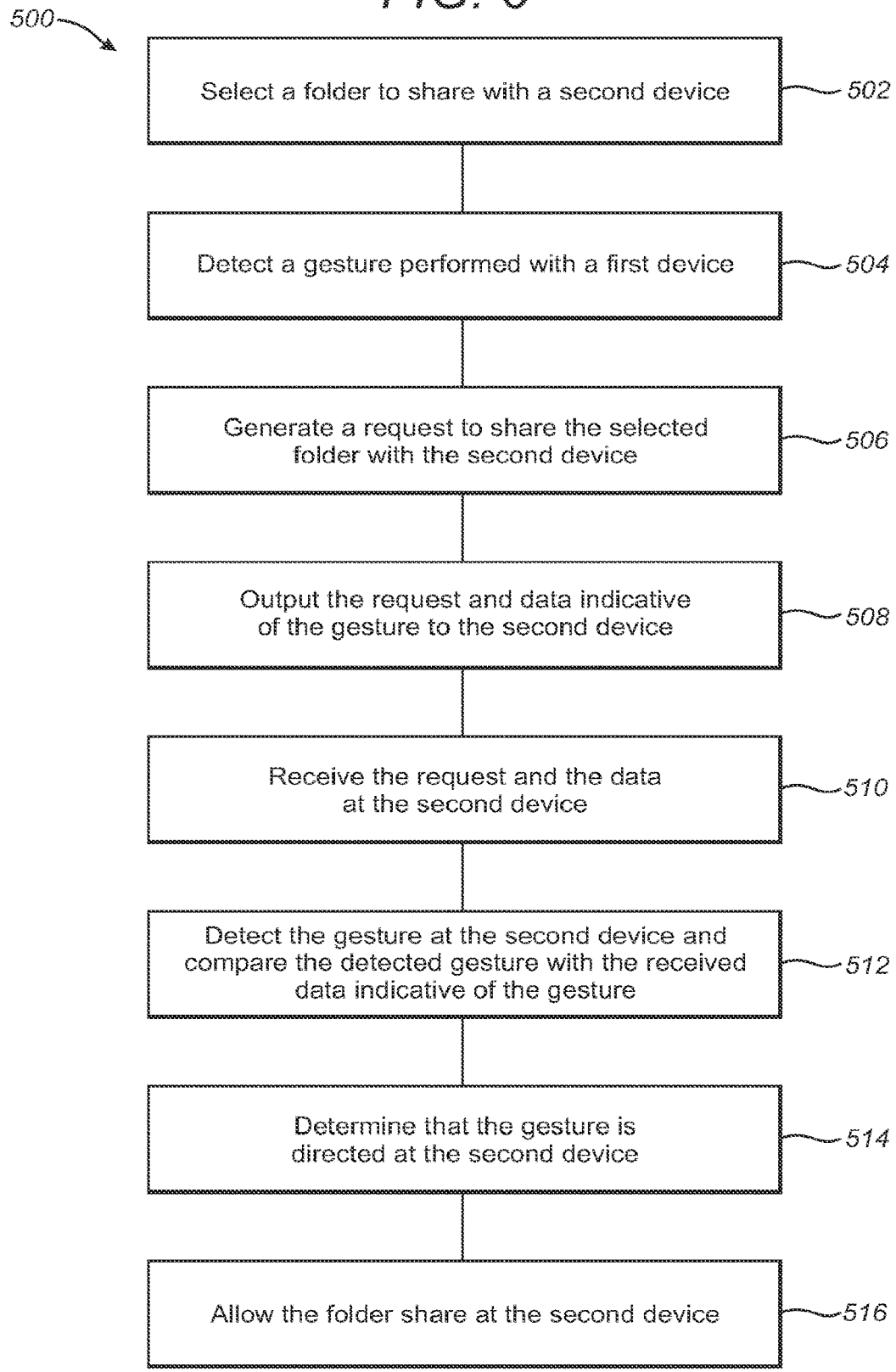

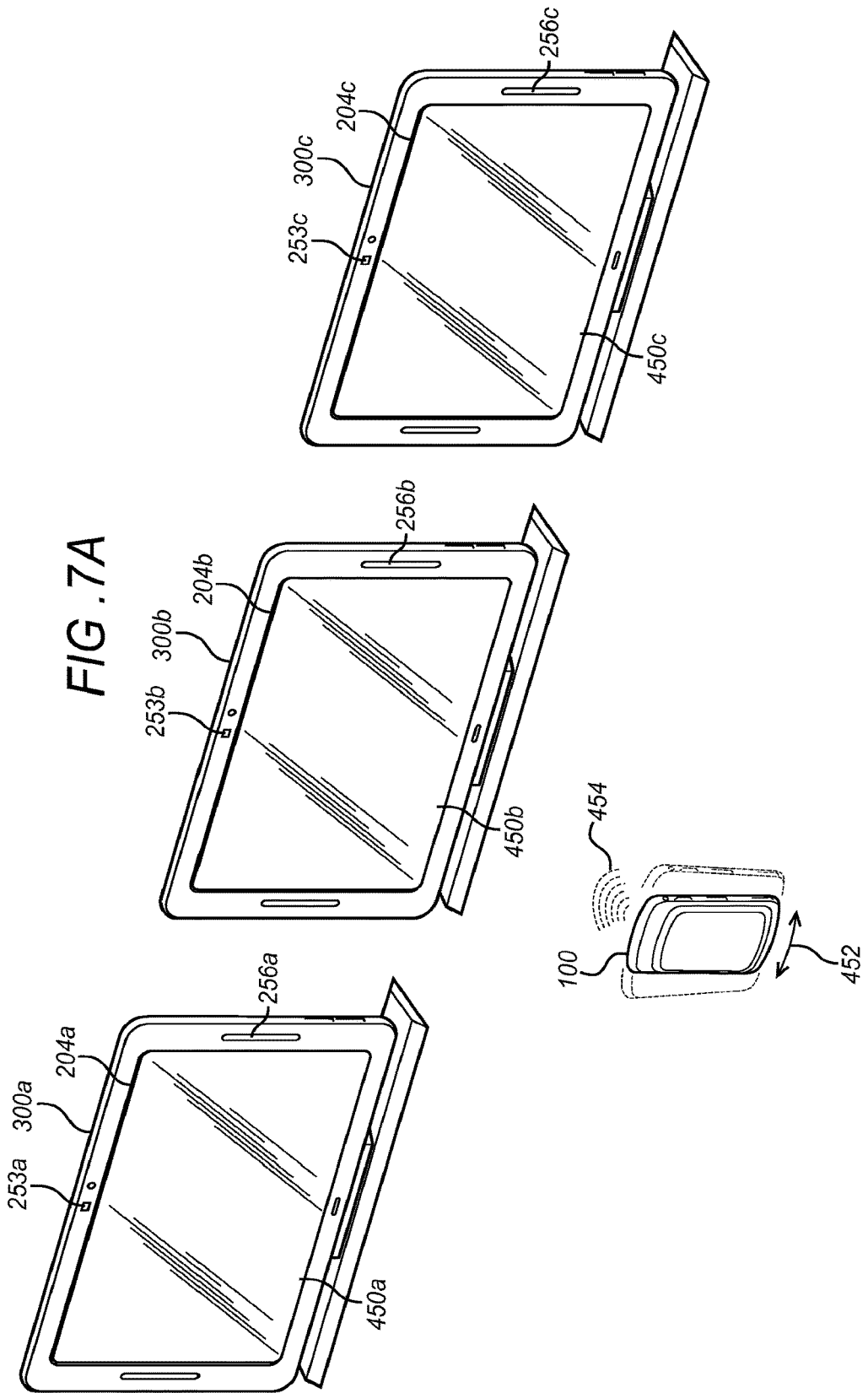

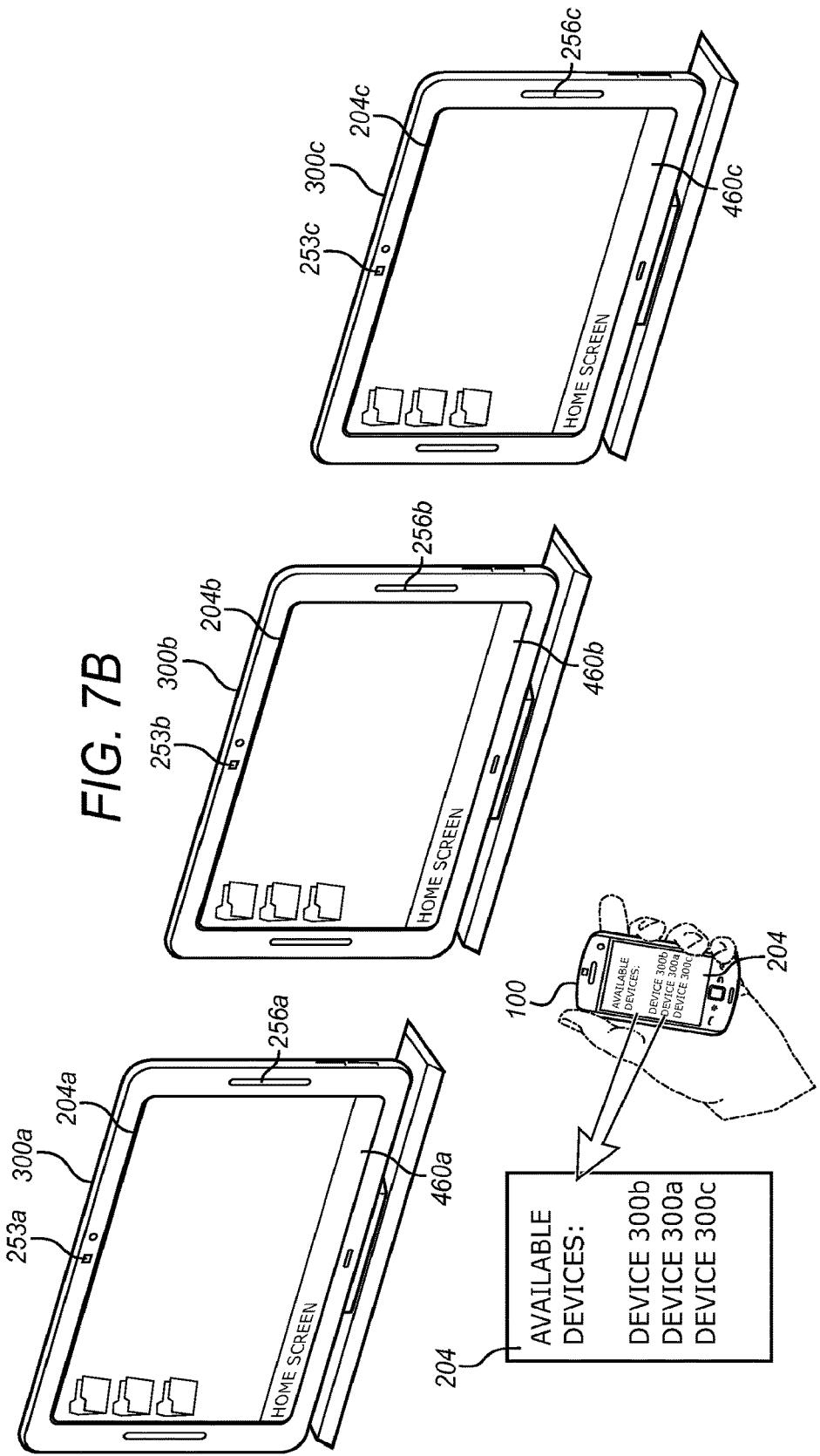

DEVICES AND METHODS FOR ESTABLISHING A COMMUNICATIVE COUPLING IN RESPONSE TO A GESTURE

CROSS-REFERENCE TO RELATED APPLICATION

This application is a continuation of co-pending U.S. patent application Ser. No. 13/923,811, filed on Jun. 21, 2013, the disclosure of which being herein incorporated by reference in its entirety.

TECHNICAL FIELD

The present disclosure relates to devices and methods for outputting a request to communicatively couple with a second device in response to a gesture performed with the first device.

BACKGROUND

An increasing number of devices can be connected to other devices. Often, a user wants to connect a personal, device which may be a handheld device (e.g. a mobile or tablet device) with another device, such as a stationary device (e.g. a personal computer, external screen, stereo system, oven, refrigerator, vehicle etc.). In some environments there might be many different devices to which a user could potentially connect their personal device. Often, different devices are named in such a way that they can be difficult to identify, and thus such devices can be difficult to identify from a long list of connectivity options. Near field circuits may be used for connecting devices, but these near field devices are not always available and require a close proximity between the two connecting devices, as well as standardised protocols, and complex circuitry and interconnections with components of the connecting devices.

BRIEF DESCRIPTION OF THE DRAWINGS

The present disclosure can be understood with reference to the description of the embodiments set out below, in conjunction with the appended drawings in which:

FIG. 6 is a flow chart depicting a method performed in association with the first and second devices illustrated in FIGS. 5A to 5D;

FIGS. 7A to 7B illustrate schematically the first and second electronic devices;

DESCRIPTION

Figure 1:
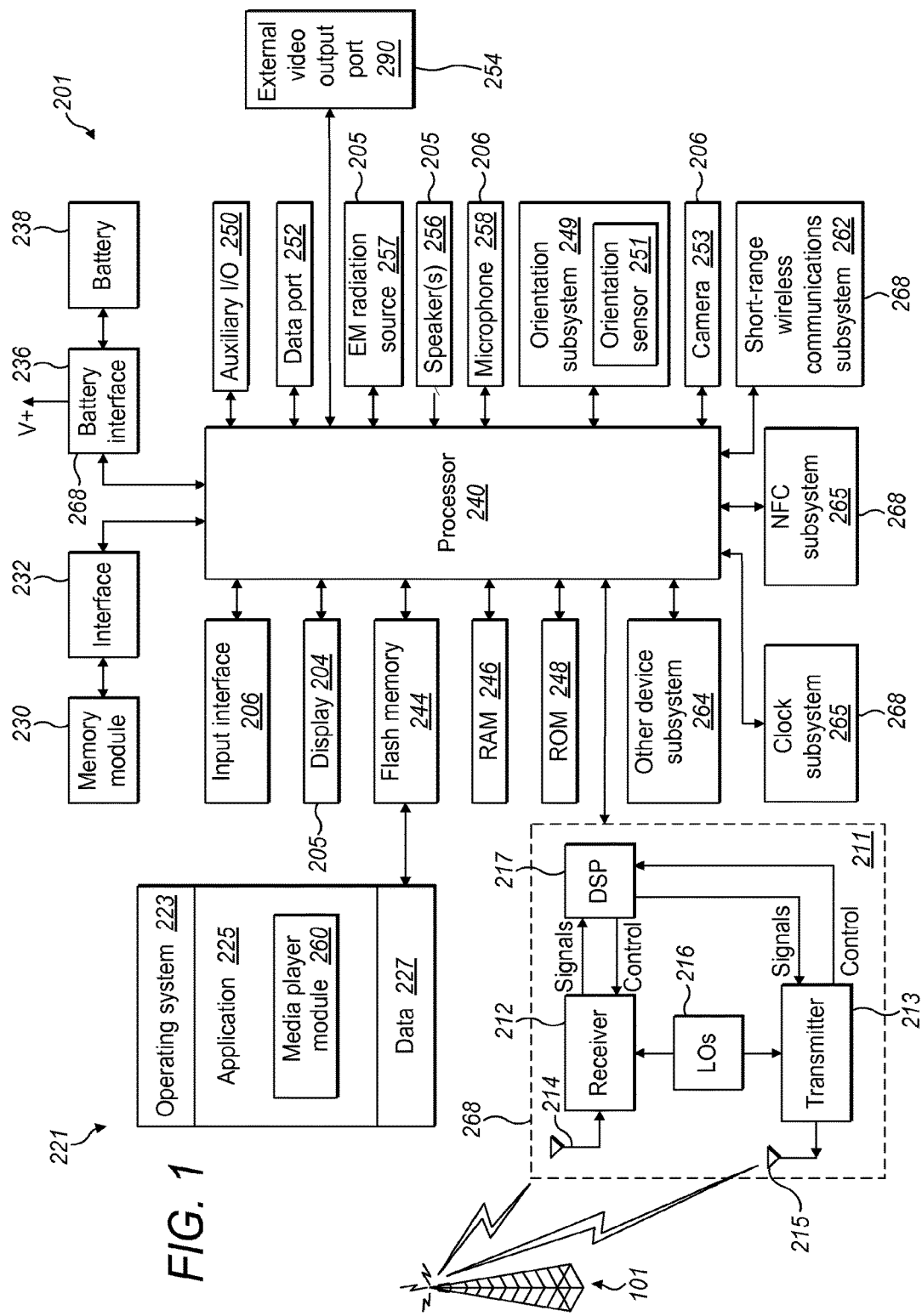
FIG. 1 is a schematic diagram illustrating components of an electronic device usable by a user.

The disclosure below is a description of one or more exemplary embodiments which are not intended to be limiting on the scope of the appended claims.

In a first aspect there is provided a method of operating a first electronic device, the method comprising: outputting a request to communicatively couple with a second electronic device in response to a gesture performed with the first electronic device. A gesture performed with the device is a gesture performed while a user is grasping or holding the first electronic device to enable the gesture movement to be detected by the first electronic device. The gesture will be typically performed by a user holding or grasping the first electronic device in his/her hand while performing the gesture with the same hand. The gesture may include any 2D or 3D special gesture performed with the first electronic device 100 and examples include one or a combination of a up/down movement, a left/right movement, repeatedly rotating the first device counter-clockwise then clockwise, moving the first electronic device in a figure eight or following a repetitive s-shape movement.

The gesture may be a predetermined gesture, and the request is output in response to detection by the first electronic device that the gesture is the predetermined gesture.

The method may comprise outputting data by the first electronic device to the second electronic device indicative of the gesture.

The request may comprise the data indicative of the gesture, and the request is transmitted to the second electronic device.

The method may comprise outputting to the second electronic device, in response to the gesture performed with the first electronic device, a signal comprising one or more of: electromagnetic radiation, such as light, a visual pattern, and/or a radio frequency signal; and sound.

The signal may be the gesture itself, or comprises information indicative of the gesture. The request may comprise the signal, or the request may be comprised in the signal.

The signal may output by the first electronic device separately from the request.

The method may comprise transmitting a user-selection of data from the first electronic device for receipt at the second electronic device, wherein the request to communicatively couple with the second electronic device is a request to transfer the selected data to the second electronic device.

The user-selection may be identified at the first electronic device in advance of the gesture being performed with the first electronic device.

The method may comprise outputting the user-selection of data to the second electronic device in response to receipt of an instruction at the first electronic device from the second electronic device to output the selected data.

The method may comprise detecting with the first electronic device the gesture performed with the first electronic device. In some examples of operation, the first electronic may not detect the gesture, rather only one or more second electronics devices may detect the gesture performed with the first electronic device. If a second electronic device detects the gesture, the second electronic device may compare data indicative of the detected gesture with data indicative of an optionally predetermined gesture stored by the second electronic device. The gesture may be optionally detected by the first electronic device 100 in a mode of operation where the second electronic device has stored therein data indicative of one or more gestures. If the gesture is not detected by the first electronic device, a different action may be used to identify that a user would like to establish a connection, for example, an input made on the first electronic device such as a gesture performed on a touch screen may be used to identify that the user would like to establish a connection.

The method may comprise receiving a response from the second electronic device indicative that the second electronic device is available for communicative coupling.

The response may be received from the second electronic device only if a predetermined criterion is met.

The criterion may comprise one or more of: the first electronic device and the second electronic device having been previously communicatively coupled to one another, the second electronic device is available for communicatively coupling with the first electronic device, and the second electronic device comprising a user account associated with the first electronic device.

The method may comprise outputting the request to a plurality of devices, wherein the second electronic device is one of the plurality of devices.

In a second aspect there is provided a method of operating a second electronic device, the method comprising: receiving a request from a first electronic device to communicatively couple with the first electronic device in response to a gesture performed with the first electronic device; and outputting from the second electronic device a response to the received request if it is determined that the second electronic device can be communicatively coupled with the first electronic device.

Outputting a response to the communicative coupling request may comprise outputting data for display at the second electronic device.

Outputting a response to the communicative coupling request may comprise outputting a response to the first electronic device to notify the first electronic device that a communicative coupling can be established.

Outputting a response to the communicative coupling request may comprise outputting an instruction to the first electronic device indicative of allowing data to be transferred to the second electronic device.

The method may comprise determining, based on a predetermined criterion, if a communicative coupling between the first electronic device and the second electronic device can be established, and establishing the communicative coupling only if the predetermined criterion is met.

The criterion may comprise one or more of the first electronic device and the second electronic device having previously been communicatively coupled to one another, the second electronic device being available for communicatively coupling with the first electronic device, and the second electronic device comprising a user account associated with the first electronic device.

Access to an account of a user may be permitted on the second electronic device if it is determined that the second electronic device comprises the user account associated with the first electronic device.

The method may comprise detecting at the second electronic device a gesture performed with the first electronic device; and the step of outputting the response comprises outputting the response only if a gesture is detected.

The step of outputting may comprise outputting the response only if the detected gesture is one of one or more predetermined gestures known to the second electronic device.

The method may comprise comparing data indicative of the detected gesture with data indicative of the one of the one or more predetermined gestures stored in memory in the second electronic device, wherein the step of outputting comprises outputting the response only if the data indicative of the detected gesture is sufficiently similar to the data of one of the one or more predetermined gestures.

Outputting a response may comprise: detecting a signal output by the first electronic device; determining, based on a signal strength of the detected signal, if a communicative coupling should be established between the second electronic device and the first electronic device; and outputting an instruction indicative of establishing a communicative coupling to the first electronic device if it is determined that a communicative coupling should be established with the first electronic device.

The signal may comprise one or more of: electromagnetic radiation, such as light, a visual pattern, and/or a radio frequency signal; and sound.

The request may comprise the signal, or the request may be comprised in the signal.

The may comprise receiving the signal by the second electronic device separate to receiving the request.

The method may comprise: receiving data indicative of the gesture performed with the first electronic device; detecting, at the second electronic device, the gesture performed with the first electronic device; and comparing the detected gesture with the data indicative of the gesture to determine a similarity between the detected gesture and the data, wherein the step of outputting the response comprises outputting a message (i.e., notification, instructions, or data) indicative of allowing a communicative coupling between the first electronic device and the second electronic device only if there is a sufficient similarity between the detected gesture and the data. It will be appreciated that receiving data indicative of the gesture performed with the first electronic device and detecting, at the second electronic device, the gesture performed with the first electronic device may be performed separate from one another. For example, the data indicative of the gesture may have been received by the second electronic device in advance of the gesture being performed, where the gesture is a predetermined gesture and will be known by the second electronic device, based on the received data, to allow a comparison to be made if and when a gesture is detected. Furthermore, it will be appreciated that the data indicative of the gesture may be received, for example periodically, at the second electronic device while the gesture is performed with the first electronic device, such that the data is representative of the gesture, but may include only a portion of the gesture being performed.

The step of comparing may comprise determining if the gesture is aimed at the second electronic device, and only if it is determined that the gesture is aimed at the second electronic device, outputting the message to the first electronic device.

The request may comprise the data indicative of the gesture.

The method may comprise: receiving data indicative of the gesture performed with the first electronic device; comparing the data indicative of the gesture with data stored in the second electronic device indicative of a predetermined gesture to determine a similarity between the received data and data indicative of the predetermined gesture, wherein the step of outputting the response comprises outputting a message indicative of allowing a communicative coupling between the first electronic device and the second electronic device only if there is a sufficient similarity between the received data and the data indicative of the predetermined gesture.

The message may comprise an instruction to the first electronic device indicative of allowing data to be transferred from the first electronic device to the second electronic device.

In a third aspect there is provided a method of operating a first electronic device and a second electronic device, the method comprising operating the first electronic device according to any one of the methods described above in relation to a first electronic device in conjunction with operating the second electronic device according to any one of the methods described above in relation to a second electronic device.

In a fourth aspect there is provided a method of operating a first electronic device and a second electronic device, the method comprising: outputting, with the first electronic device, a request to communicatively couple with the second electronic device in response to a gesture performed with the first electronic device, receiving, with the second electronic device, the request to communicatively couple with the first electronic device; and outputting, with the second electronic device, a response to the received request if it is determined that the second electronic device can be communicatively coupled with the first electronic device.

In a fifth aspect there is provided a computer-readable medium comprising executable instructions which, when executed by processing circuitry, cause the processing circuitry to perform any one of the methods described above.

In a sixth aspect there is provided a computer-readable medium comprising computer executable instructions which, when executed by processing circuitry, cause the processing circuitry to: output a request to communicatively couple with a second electronic device in response to a gesture performed with the first electronic device.

In a seventh aspect there is provided a computer-readable medium comprising computer executable instructions which, when executed on processing circuitry, cause the processing circuitry to: receive a request to communicatively couple with a first electronic device in response to a gesture performed with the first electronic device; and output a response to the received request if it is determined that the second electronic device can be communicatively coupled with the first electronic device.

The executable instructions may be computer-executable instructions. A device may be configured to receive the executable instructions from the computer-readable medium, and/or comprise the executable instructions, and be configured to execute the executable instructions. The computer readable medium may be a non-transitory computer readable medium.

In an eighth aspect there is provided an electronic device comprising processing circuitry configured to perform any one of the methods described above. The processing circuitry may comprise one or more discrete electronic components.

In a ninth aspect there is provided an electronic device being a first electronic device comprising processing circuitry configured to communicatively couple with a second electronic device and output a request to communicatively couple with the second electronic device in response to a gesture performed with the first electronic device.

The gesture may be a predetermined gesture, and the response is output in response to detection by the first electronic device that the gesture is the predetermined gesture.

The processing circuitry may be further configured to output data to the second electronic device indicative of the gesture.

The request may comprise the data indicative of the gesture, and the request is transmitted to the second electronic device.

The processing circuitry may be further configured to output, in response to the gesture performed with the first electronic device, a signal comprising one or more of: electromagnetic radiation, such as light, a visual pattern, and/or a radio frequency signal; and sound.

The signal may be the gesture itself, or may comprise information indicative of the gesture.

The request may comprise the signal, or the request may be comprised in the signal.

The signal may be output by the first electronic device separately from the request.

The request to communicatively couple with the second electronic device may be a request to transfer a user-selection of data to the second electronic device.

The user-selection of data may be identified at the first electronic device in advance of the gesture being performed.

The processing circuitry may be configured to output the user-selection of data to the second electronic device in response to receipt of an instruction from the second electronic device to output the user selection of data.

The device may comprise a gesture input device configured to detect the gesture performed with the first electronic device.

The gesture input device may comprise one or more of: a motion sensor, an accelerometer, and a gyroscope.

The processing circuitry may be configured to receive a response from the second electronic device indicative that the second electronic device is available for communicative coupling.

The response may be received from the second electronic device only if a predetermined criterion is met.

The criterion may comprise one or more of: the first electronic device and the second electronic device having previously been communicatively coupled to one another; the second electronic device being available for communicatively coupling with the first electronic device; and the second electronic device comprising a user account associated with the first electronic device.

The processing circuitry may be configured to output the request to a plurality of devices, wherein the second electronic device is one of the plurality of devices.

In a tenth aspect there is provided an electronic device being a second electronic device comprising processing circuitry configured to communicatively couple with a first electronic device, wherein the processing circuitry is further configured to: receive a request from the first electronic device to communicatively couple with a first electronic device in response to a gesture performed with the first electronic device; and output a response to the received request if it is determined that the second electronic device can be communicatively coupled with the first electronic device.

The device may comprise a display coupled to the processing circuitry, wherein the processing circuitry is further configured to output response data on the display if it is determined that the second electronic device can be communicatively coupled with the first electronic device.

The processing circuitry may be configured to output a response to the communicative coupling request by outputting a response to the first electronic device to notify the first electronic device that a communicatively coupling can be established.

The processing circuitry is further configured to output an instruction to the first electronic device indicative of allowing data to be transferred to the second electronic device.

The processing circuitry may be further configured to determine, based on a predetermined criterion, if a communicative coupling between the first electronic device and the second electronic device can be established, and establishing the communicative coupling only if the predetermined criterion is met.

The criterion may comprise one or more of: the first electronic device and the second electronic device having previously been communicatively coupled to one another; the second electronic device being available for communicatively coupling with the first electronic device; and the second electronic device comprising a user account associated with the first electronic device.

Access to an account of a user may be permitted on the second electronic device if it is determined by the processing circuitry that the second electronic device comprises a user account associated with the first electronic device.

The processing circuitry may be further configured to detect at the second electronic device a gesture performed with the first electronic device; and output the response only if a gesture is detected.

The processing circuitry may be further configured to output the response only if the detected gesture is one of one or more predetermined gestures known to the second electronic device.

The processing circuitry may be further configured to compare data indicative of the detected gesture with data indicative of the one of the one or more predetermined gestures stored in memory in the second electronic device, wherein the step of outputting comprises outputting the response only if the data indicative of the detected gesture is sufficiently similar to the data of one of the one or more predetermined gestures.

The processing circuitry may be configured to: detect a signal output by the first electronic device; determine, based on a signal strength of the detected signal, if a communicative coupling should be established between the second electronic device and the first electronic device; and output an instruction indicative of establishing a communicative coupling to the first electronic device if it is determined that a communicative coupling should be established with the first electronic device.

The signal may comprise one or more of: electromagnetic radiation, such as light, a visual pattern, and/or a radio frequency signal; and sound.

The request may comprise the signal or the request may be comprised in the signal.

The processing circuitry may be configured to receive the signal by the second electronic device separate to receiving the request.

The processing circuitry may be configured to: receive data indicative of the gesture performed with the first electronic device; detect the gesture performed with the first electronic device; and compare the detected gesture with the data indicative of the gesture to determine a similarity between the detected gesture and the data, wherein the output of a response by the processing circuitry is output of a message indicative of allowing a communicative coupling between the first electronic device and the second electronic device which occurs only if there is a sufficient similarity between the detected gesture and the data.

The processing circuitry may be configured to compare the detected gesture with the data indicative of the gesture by determining if the gesture is aimed at the second electronic device, and only if it is determined that the gesture is aimed at the second electronic device, output the message to the first electronic device.

The request may comprise the data indicative of the gesture.

The processing circuitry is further configured to: receive data indicative of the gesture performed with the first electronic device; compare the data indicative of the gesture with data stored in the second electronic device indicative of a predetermined gesture to determine a similarity between the received data and data indicative of the predetermined gesture, wherein the output of a response is the output of a message indicative of allowing a communicative coupling between the first electronic device and the second electronic device which occurs only if there is a sufficient similarity between the received data and the data indicative of the predetermined gesture.

The message may comprise an instruction to the first electronic device indicative of allowing data to be transferred from the first electronic device to the second electronic device.

An electronic device being a first electronic device comprising processing circuitry configured to perform the method of: outputting a request to communicatively couple with a second electronic device in response to a gesture performed with the first electronic device.

An electronic device being a second electronic comprising processing circuitry configured to perform the method of: receiving a request from a first electronic device to communicatively couple with the first electronic device in response to a gesture performed with the first electronic device; and outputting from the second electronic device a response to the received request if it is determined that the second electronic device can be communicatively coupled with the first electronic device.

In an eleventh aspect there is provided a system comprising any one of the first electronic devices described above in conjunction with any one of the second electronic devices described above.

In a twelfth aspect there is provided a system comprising a first electronic device comprising processing circuitry configured to perform any one of the methods described above in relation to a first electronic device and a second electronic device comprising processing circuitry configured to perform any one of the methods described above in relation to a second electronic device.

In a thirteenth aspect there is provided a system comprising a first electronic device and a second electronic device: the first electronic device comprising first processing circuitry configured to communicatively couple with the second electronic device and output a request to communicatively couple with the second electronic device in response to a gesture performed with the first electronic device; and the second electronic device comprising second processing circuitry configured to communicatively couple with the first electronic device, wherein the processing circuitry is further configured to: receive a request to communicatively couple with the first electronic device; and output a response to the received request if it is determined that the second electronic device can be communicatively coupled with the first electronic device.

Reference is made to FIG. 1 which illustrates an electronic device 201 which is usable in accordance with the disclosure below. An electronic device 201 such as the electronic device 201 of FIG. 1 is configured to generate a user-controllable interface on a built-in display and/or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection.

It will be appreciated that, in certain embodiments, some of the features, systems or subsystems of the electronic device 201 discussed below with reference to FIG. 1 may be omitted from electronic devices 201 which are intended to perform solely operations in relation to the generation and output of display data and the modification of media content output.

In one embodiment, the electronic device 201 is a communication device and, more particularly, may be a mobile or handheld device, such as a mobile or handheld communication device, for example having data and voice communication capabilities. It may also have the capability to communicate with other computer systems; for example, via a data link or network, such as a short-range radio frequency link, e.g. Bluetooth, or via a data network, which may be wireless (e.g., Wi-Fi using IEEE 802.11 radio standards) and may be connected to the Internet. It will be appreciated that the electronic device 201 may take other forms, including any one of the forms listed below. Depending on the functionality provided by the electronic device 201, in certain embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile, handheld or portable communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket.

The electronic device 201 includes a controller including processing circuitry, such as a processor 240 (such as a microprocessor) which controls the operation of the electronic device 201. Reference is made herein to a processor, but it will be understood that In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one embodiment is the flash memory 244. In various embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one embodiment, the system clock comprises its own alternate power source. The system clock provides an indicator of a current time value, the system time, represented as a year/month/day/hour/minute/second/milliseconds value. In other embodiments, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The processor 240 is in communication with the memory and the touch-sensitive input interface 206 to detect user input via the input interface 206. The processor 240 then generates or updates display data comprising a display object for display by the display device 204 in accordance with the user input. The processor 240 then outputs the display data for display on the display device 204. In an embodiment, the user input may comprise a swipe gesture across the touchscreen interface 206.

In at least some embodiments, the touch-sensitive overlay has a touch-sensitive input surface which is larger than the display 204. For example, in at least some embodiments, the touch-sensitive overlay may extend overtop of a frame (not shown) which surrounds the display 204. In such embodiments, the frame (not shown) may be referred to as an active frame since it is capable of acting as an input interface 206. In at least some embodiments, the touch-sensitive overlay may extend to the sides of the electronic device 201.

The input interface 206 may also comprise the touchscreen, in which case the electronic device 201 may be referred to as a 'multi-touch device'. The input detected by the touchscreen interface may comprise any suitable user touch-based input. For example, the input may comprise a gesture input such as a tap, a multi-tap, a long press, a swipe or scroll or slide, a pan, a flick, a multi-swipe, a multi-finger tap, a multi-finger scroll or swipe, a pinch, a two-hand pinch, a spread, a two-hand spread, a rotation, a two-hand rotation, a slide and rotation, a multi-direction slide, a multi-finger slide and rotation, a multi-finger slide, etc. It will be appreciated that the gesture input may comprise a sequence of input elements or stages performed within a specified or predetermined time frame, for example, a three-tap gesture in which each tap comprises an element (or a sub-input, a phase or a stage) of the input and the three taps are performed within a time frame that enables the processor 240 to detect the taps as elements of a single input. Additionally or alternatively, an input may comprise removing a point of contact, e.g., a finger or stylus, from the touchscreen interface.

Many examples described herein refer to a gesture detected by a touch-sensitive display, but other methods of gesture detection may be used. For example, a gesture may be a generalized trajectory description characterized as a sequence of 3D points in time, and as such many different sensors may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known.

An accelerometer or gyroscope may be utilized to detect 3D spatial gestures. A sequence of acceleration values may be detected in the different spatial dimensions as a function of time and constitute trajectory information that can be recognized as a gesture. For example, a quick flick, a tilt of the portable electronic device and a repetitive movement from left-to-right are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device.

A gesture input is different to input of a command by manipulation of a control component presented on the screen because a gesture input can be performed at any location within the display screen (or a large area of the display screen) in contrast to a single contact point for a user finger or input stylus on a corresponding control element. In order to input a command using a control component, the user must contact the screen at a specific location corresponding to that component. For example, in order to change an output volume using a volume control, the user must select the volume control by touching the location at which the volume control is displayed and moving the displayed control element by a desired amount through movement of the user's finger across the screen. Such user input must therefore be precisely controlled in order to use control elements to input commands. Gesture-based inputs, on the other hand, do not require the same precise control as they are not tied to a specific location on the screen. Instead, a user wishing to, e.g., scroll through a list of media content can do so by performing a swipe gesture at any location within a media-player display.

As noted above, in some embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some embodiments, the orientation subsystem 249 includes other orientation sensors 251, instead of or in addition to accelerometers. For example, in various embodiments, the orientation subsystem 249 may include a gravity sensor, a gyroscope, a tilt sensor, an electronic compass or other suitable sensor, or combinations thereof. In some embodiments, the device orientation subsystem 249 may include two or more orientation sensors 251 such as an accelerometer and an electronic compass.

The electronic device 201, in at least some embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some embodiments, an electronic device 201 includes a plurality of speakers 256. For example, in some embodiments, the electronic device 201 includes two or more speakers 256. The two or more speakers 256 may, for example, be disposed in spaced relation to one another. That is, in at least some embodiments, the electronic device 201 may include a first speaker and a second speaker and the first speaker and the second speaker may be spatially separated from one another within the electronic device 201. In at least some embodiments, the display 204 may be disposed between the first speaker and the second speaker of the electronic device. In such embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such embodiments, the direction of capture of the camera is always predictable relative to the display 204 or the housing. In at least some embodiments, the camera may be provided in a central location relative to the display 204 to facilitate image acquisition of a face.

In at least some embodiments, the electronic device 201 includes an electromagnetic (EM) radiation source 257. In at least some embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

In some embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of an incoming message being received by the electronic device 201. The incoming message may be an email, a message received via a social networking website, an SMS (short message service) message, or a telephone call, for example.

The electronic device 201 is, in some embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244.

As illustrated in FIG. 1, the software modules 221 include operating system software 223 and other software applications 225 such as a media player module 260. In the embodiment of FIG. 1, the media player module 260 is implemented as a stand-alone application 225. However, in other embodiments, the presentation module 260 could be implemented as part of the operating system 223 or other applications 225.

As discussed above, electronic devices 201 which are configured to perform operations in relation to a communications log may take a variety of forms. In at least some embodiments, one or more of the electronic devices which are configured to perform operations in relation to the presentation module 260 are a smart phone or a tablet computer.

Figure 2:
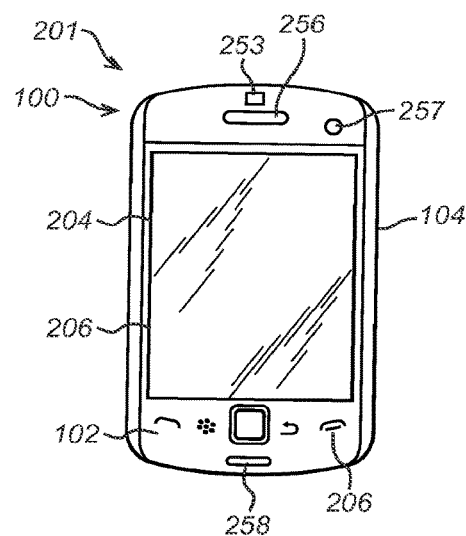
FIG. 2 is a plan view of an upper external side of a first electronic device usable by an end-user.

Referring now to FIG. 2, a front view of an electronic device 201 which in one example may be a mobile device 100 is illustrated. The mobile device 100 (e.g. smart phone) is a phone which offers more advanced computing capability than a basic non-smartphone cellular phone. For example, the mobile device 100 may have the ability to run third party applications which are stored on the mobile device.

The mobile device 100 includes all of the components discussed above with reference to FIG. 1, or a subset of those components. The mobile device 100 includes a housing 104 which houses at least some of the components discussed above with reference to FIG. 1.

In the embodiment, the mobile device includes a display 204, which may be a touchscreen which acts as an input interface 206. The display 204 is disposed within the mobile device 100 so that it is viewable at a front side 102 of the mobile device 100. That is, a viewable side of the display 204 is disposed on the front side 102 of the electronic device. In the embodiment illustrated, the display 204 is framed by the housing 104.

The mobile device 100 also includes other input interfaces 206 such as one or more buttons, keys or navigational input mechanisms. In the embodiment illustrated, at least some of these additional input interfaces 206 are disposed for actuation at a front side 102 of the mobile device.

The mobile device may also include a speaker 256. In the embodiment illustrated, the mobile device includes a single speaker 256 which is disposed vertically above the display 204 when the mobile device 100 is held in a portrait orientation where its height is longer than its width. The speaker 256 may be disposed on the front face of the mobile device 100.

While the mobile device 100 of FIG. 2 includes a single speaker 256, in other embodiments, the mobile device 100 may include a greater number of speakers 256. For example, in at least some embodiments, the mobile device 100 may include a second speaker 256 which is disposed vertically below the display 204 when the mobile device is held in a portrait orientation where its height is longer than its width (i.e. the orientation illustrated in FIG. 2).

The mobile device 100 also includes a microphone 258. In the embodiment illustrated, the microphone 258 is vertically disposed below the display 204 when the mobile device is held in the portrait orientation. The microphone 258 and at least one speaker 256 may be arranged so that the microphone is in close proximity to a user's mouth and the speaker 256 is in close proximity to a user's ear when the user holds the phone to their face to converse on the mobile device.

The mobile device 100 also includes a front facing camera 253 which may be located vertically above the display 204 when the mobile device 100 is held in a portrait orientation where its height is longer than its width. The front facing camera 253 is located so that it may capture images of objects which are located in front of or surrounding the front side of the mobile device 100.

The mobile device 100 also includes an electromagnetic radiation source 257. The electromagnetic radiation source 257 is disposed on the front side 102 of the mobile device 100. In this orientation, electromagnetic radiation which is produced by the electromagnetic radiation source 257 may be projected onto objects which are located in front of or surrounding the front side of the mobile device 100. Such electromagnetic radiation (or the projection of electromagnetic radiation onto objects) may be captured on images detected by the camera 253.

Figure 3:
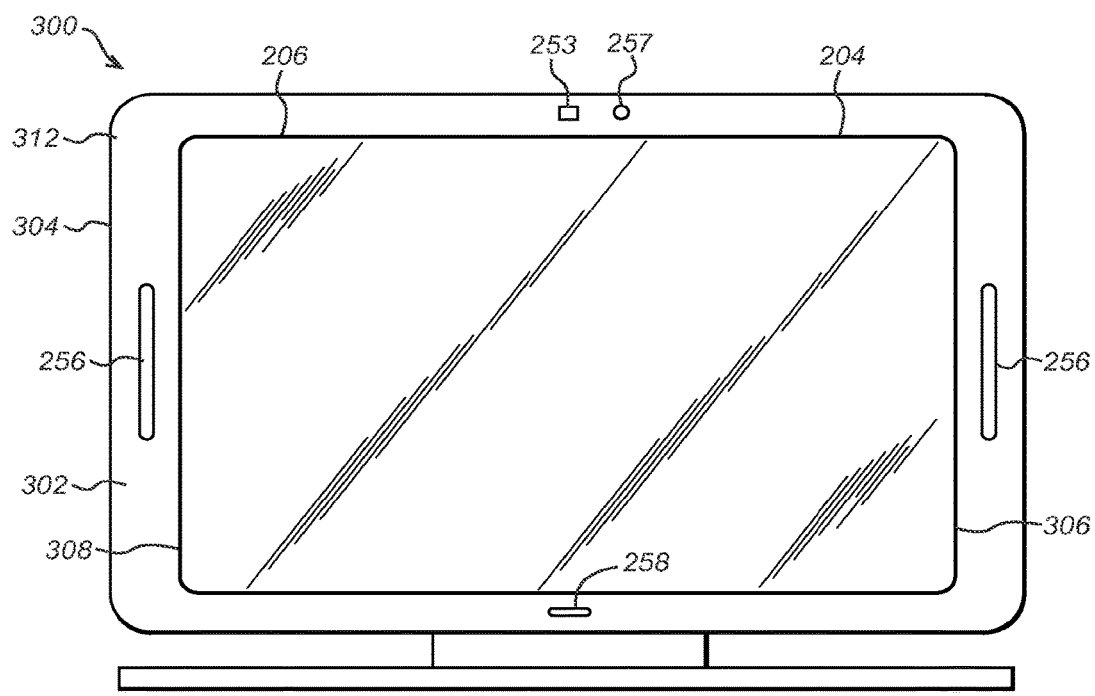
FIG. 3 is a plan view of a front view of a second electronic device usable by an end-user.

Referring now to FIG. 3, a front view of an example electronic device 201, which in one embodiment may be a computer 300, is illustrated. The computer 300 may be a general purpose computer device of the form that includes a processor 240 and a display 204 within the same housing. The computer 300 also comprises one or more input devices 206 including a keyboard (not shown).

The computer 300 may be any other form of electronic device and includes mobile devices, laptop computers, personal computers, a desk top computer or tablet computer. The computer or electronic device 300 may include the components discussed above with reference to FIG. 1 or a subset of those components. The electronic device 300 includes a housing 304 which houses at least some of the components discussed above with reference to FIG. 1.

The electronic device 300 includes a display 204, which may be a touchscreen which acts as an input interface 206. The display 204 is disposed within the electronic device 300 so that it is viewable at a front side 302 of the electronic device 300. That is, a viewable side of the display 204 is disposed on the front side 302 of the electronic device 300. In the embodiment illustrated, the display 204 is framed by the housing 304.

A frame 312 surrounds the display 204. The frame 312 is portion of the housing 304 which provides a border around the display 204. In at least some embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The electronic device 300 includes a plurality of speakers 256. In the embodiment illustrated, the computer includes two speakers 256. The two speakers 256 are disposed on opposing sides of the display 204. More particularly, when the electronic device 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the electronic device 300.

The electronic device 300 also includes a microphone 258. In the embodiment illustrated, the microphone 258 is vertically disposed below the display 204 when the electronic device is held in the landscape orientation illustrated in FIG. 3. The microphone 258 may be located in other locations in other embodiments.

The electronic device 300 also includes a front facing camera 253 which may be located vertically above the display 204 when the electronic device 300 is held in a landscape orientation (i.e. the orientation of FIG. 3). The front facing camera 253 is located so that it may capture images of objects which are located in front of or surrounding the front side of the electronic device 300.

The example electronic device 300 also includes an electromagnetic radiation source 257. The electromagnetic radiation source 257 is disposed on the front side 304 of the electronic device 300. In this orientation, electromagnetic radiation which is produced by the electromagnetic radiation source 257 may be projected onto objects which are located in front of or surrounding the front side 302 of the electronic device 300. Such electromagnetic radiation (or the projection of electromagnetic radiation onto objects) may be captured on images detected by the camera 253.

The electronic device 300 may have the ability to run third party applications which are stored on the electronic device.

The electronic device 201, which may be tablet computer or other mobile device 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-user's text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a web-site using a browser on any internet-enabled electronic device.

Figure 4:
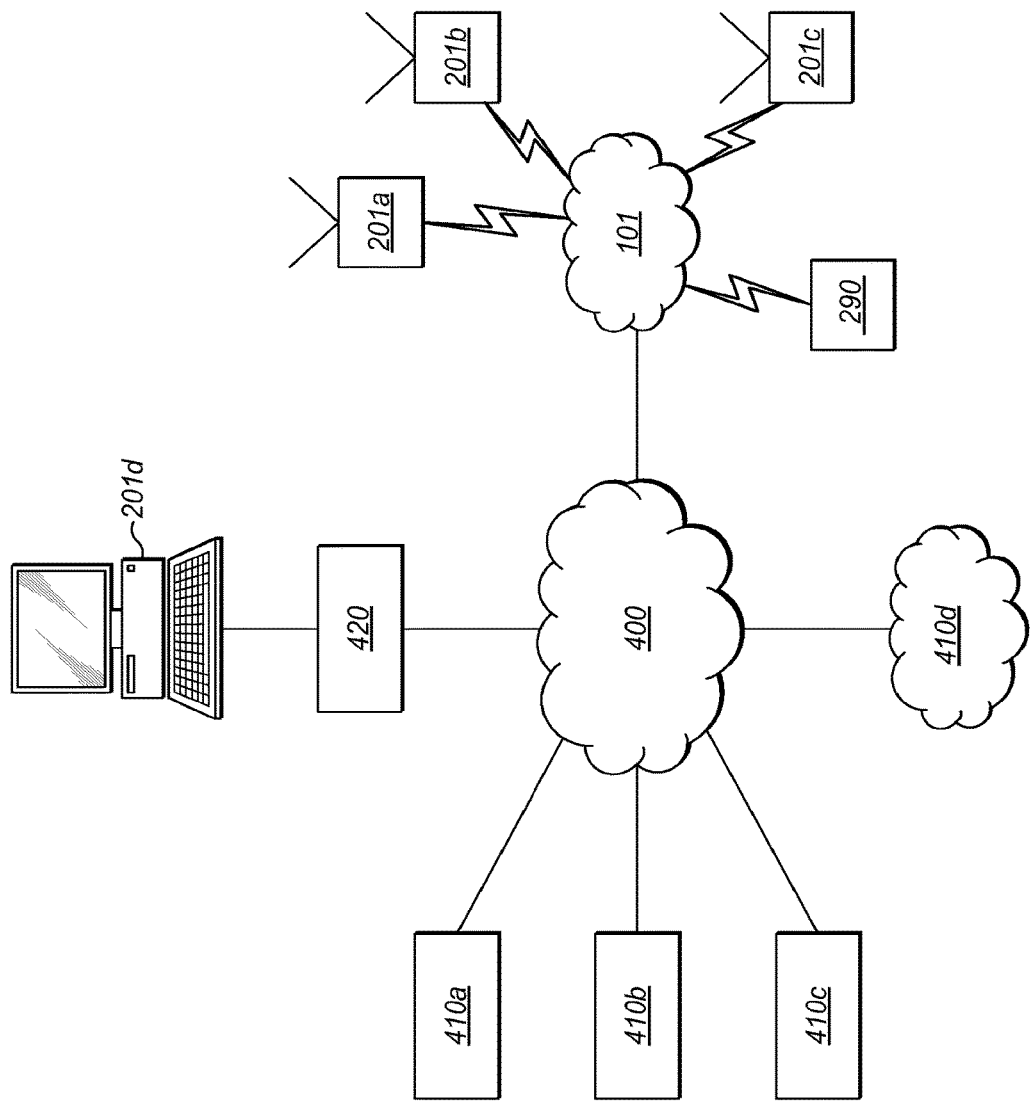
FIG. 4 is a schematic diagram of a system in which the aforementioned electronic devices can be employed in some embodiments.

FIG. 4 shows a system of networked apparatus by which electronic communications can be sent and received using multiple electronic devices 201a, 201b, 201c. Referring to FIG. 4, electronic devices 201a, 201b and 201c are connected to wireless network 101 to perform voice and data communications, and to transmit data to an external display device 290 residing on the wireless network. Wireless network 101 is also connected to the communications network 400, e.g. Internet. Electronic device 201a may be a tablet computer similar to computer 300 described in association with FIG. 3 above. Electronic devices 201b and 201c may be smartphones. Electronic device 201d is a computing device such as a notebook, laptop or desktop, which is connected by a wired broadband connection to Local Area Network 420, and which is also connected to the communications network 400. Electronic devices 201a, b, c, d may access the communications network 400 to perform data communications therewith.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers.

Other servers and services may of course be provided allowing users of electronic devices 201a, 201b, 201c and 201d to send and receive electronic communications by, for example, Voice over IP phone calls, video IP calls, video chat, group video chat, blogs, file transfers, instant messaging, and feeds.

Wireless network 101 may also support electronic communications without using communications network 400. For example, a user of smart phone 201b may use wireless network 101 to make telephony calls, video calls, send text messages, send multimedia messages, and send instant messages to smart phone 201c, and to display application data on a display screen of the external display device 290, or control the display of application data.

The embodiment shown in FIG. 4 is intended to be non-limiting and additional network infrastructure may of course be provided, such as a Public Switched Telephone Network (not shown), which may be used, for example, to make telephony calls using smartphone 201b to a wired phone (not shown).

In order to explain certain example modes of operation, reference is made below to FIGS. 5A to 9.

Reference is made to a first electronic device 100, as described in association with FIG. 2, and a second electronic device 300, as described in association with FIG. 3, each of which include a processor 240 that is functionally similar but is a different processor. The processor 240 may comprise one or more processing circuits configured to perform the methods described herein and the one or more processing circuits may comprise one or more discrete electronic processing components.

FIGS. 5A to 5D are now used in conjunction with a flow chart 500 illustrated in FIG. 6 to illustrate a mode of operation in accordance with an embodiment of the invention. It is noted that the steps illustrated in flow chart 500 may be performed in a different order and one or more steps may be optionally performed.

Figure 5A:
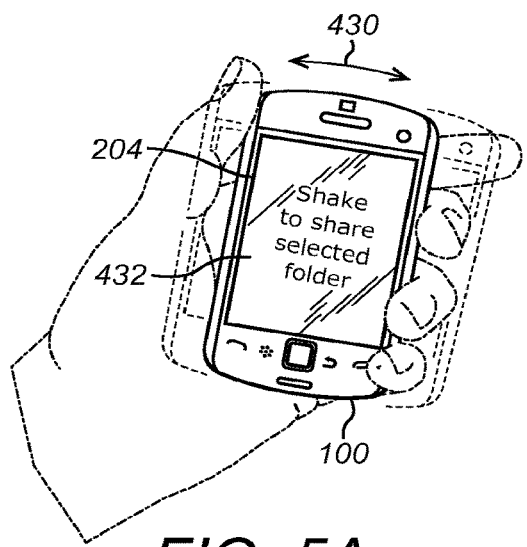
FIGS. 5A to 5D illustrate schematically the first and second electronic devices used in conjunction with one another.

FIG. 5A illustrates the first electronic device 100. The first electronic device 100 has stored thereon (for example, in memory 248) an application that allows a user to more easily, collaborate with, or transfer data to the second electronic device 300. This is achieved, in this example, by providing a data folder on the second device 300 which links to a predetermined data folder of the first device 100. It is assumed that prior to performing the steps illustrated in FIG. 6, a user of the first device 100 has previously established a connection or communicative coupling with the second device 300 over a wireless network, for example, such that a connection can be more easily established (i.e., re-established). Thus, since a connection has been previously established, re-establishing a connection is made simpler, since the connection settings of the first device 100 are known by the second device 300 and vice-versa.

In block 502 of the flow chart 500, a user selects a folder within the file structure memory (e.g. memory 248) of the first device 100. The user selection of the folder is performed by selecting a folder, entering a menu associated with the selected folder and selecting to share the contents of the selected folder with a further, separate, device. It will be appreciated that the same sharing technique may also be used for individual files. Once a folder or file is selected by a user, the processor 240 of the first device 100 generates data for a display on the display 204 of the first device 100 to shake the device to share the folder, for example. An example of a display provided to a user is illustrated in FIG. 5A, "Shake to share selected folder". It will be appreciated that other messages may be displayed to a user, e.g. "Shake to share" or "Perform a gesture with the device". The "shake" gesture 430 is illustrated in the figure.

In this example the steps of selecting a file or folder and performing a gesture are described as two separate steps, where the step of performing a gesture is performed after the file or folder selection is made. However, in other example modes of operation, a predetermined gesture may be associated with establishing a connection with a further device, for example. When the predetermined gesture is performed with the first device 100, and the processor 204 of the first device 100 determines that the performed gesture matches the predetermined gesture, a connection request is output by the first device 100, and optionally data indicative of the gesture is output with the request, to the second device 300.

Figure 5B:
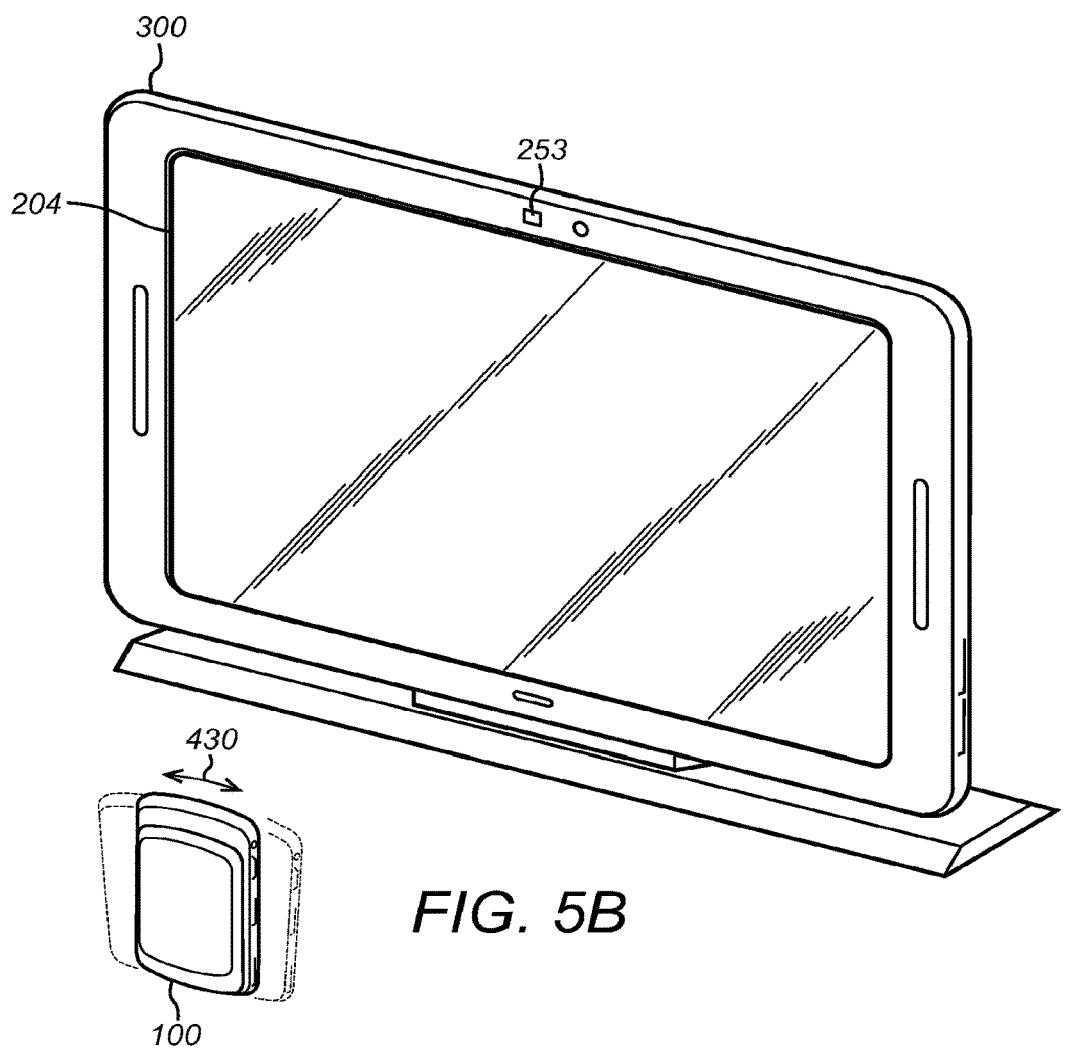

FIG. 5B illustrates schematically a user performing a left-to-right repetitive gesture 400 with the first device 100 in proximity to the second device 300. In this example the gesture performed with the device is a left-to-right gesture performed with the first device, but other gestures are envisaged, for example any repetitive gesture such as: top-to-bottom, rotating clockwise-counter clockwise, figure of eight or repetitive s-shape movements. Other 2D or 3D special gestures performed with the first device 100 are envisaged. The gesture 430 is performed within a predetermined distance of the second device 300 (e.g., 0.25, 0.5, 0.75, 1, 2, 3, 4, 5, 6, 7, 8, 9 or 10 meters) and for a predetermined time (e.g., 1, 3, 5, 10, 15, 20, 25, 30, 35, 40, 45, 50, 55 or 60 second). It will be appreciated that these are only examples and are not intend to be limiting. Alternatively, the gesture may be performed until prompted to stop, e.g., by a message displayed on the display 204 of one or more of the first or second devices 100, 300. The gesture is predetermined and associated with the application for file sharing, or establishing a communication connection with the first electronic device 100 and a further, remote, second electronic device 300.

In block 504, the gesture 430 performed with the first device 100 is detected by one or more of the orientation sensors 251 (e.g., gyroscope or accelerometer) of the first device 100. The processor 240 of the first device 100, which is coupled to the orientation sensors 251, generates data indicative of the detected gesture. The data indicative of the detected gesture comprises, for example, a distance moved, a velocity of the movement, an angle of rotation and a distance of rotation. The data indicative of the gesture 430 is used by the processor 240 of the first device 100 to determine if the gesture performed is the predetermined gesture associated with file or data sharing.

In block 506, the processor 240 of the first device 100 generates data indicative of a request to share the selected folder and its contents with a second device 300. For example, data obtained from available input sensors of the first device 100 are used to generate a model of the gesture, e.g. a 3D model, performed with the first device 100. The first device 100 will typically generate the model using input from different sensor types. This use of more than one sensor may increase the robustness of the model due to the introduction of variances of the model terms. The detection of gestures and generation of 3D models is known in the art from, for example, InvenSense (http://www.invensense.com/index.html).

The data relating to the model is the data indicative of the particular gesture being performed. The request is in the form of a broadcast to all devices within communicative range of the first device 100. That is to say that in this example the request is not addressed to a specific second electronic device, remote from the first device 100. Rather the request is made to a plurality of devices within communicative range of the first device 100. The request contains data related to the first device 100, e.g., identification and connection type, and includes details of the folder to be shared, in addition to the data indicative of the gesture.

In block 508, the first device 100 outputs the request and the data indicative of the gesture performed at the device to one or more second, remote, devices. The request and data are output in a packet format as a broadcast, as is typical in the art, over a short-range radio frequency link, for example, Bluetooth or via a data network (e.g., Wi-Fi using IEEE 802.11 radio standards wireless network). As discussed above, it is assumed in this example that the first device 100 has previously established a communicative link with one or more second devices, such that the request and the data indicative of the gesture is output as a broadcast to those second devices with which a previous communicative link has been established. It will be appreciated that the data indicative of the gesture may be continuously generated and outputted by the first device 100, as the gesture is performed. For example, data indicative of the gesture may be generated and outputted every 1, 2, 3, 4, 5, 6, 7, 8, 9 or 10 seconds while the gesture is continuously performed. Indeed, it will be appreciated that there may not be a set, or predetermined, start and end point of the gesture. Rather the gesture is a continuous movement, such as a figure of eight or a continuous forward and backward trace of an "S" following an s-shaped movement, for example.

Figure 5C:
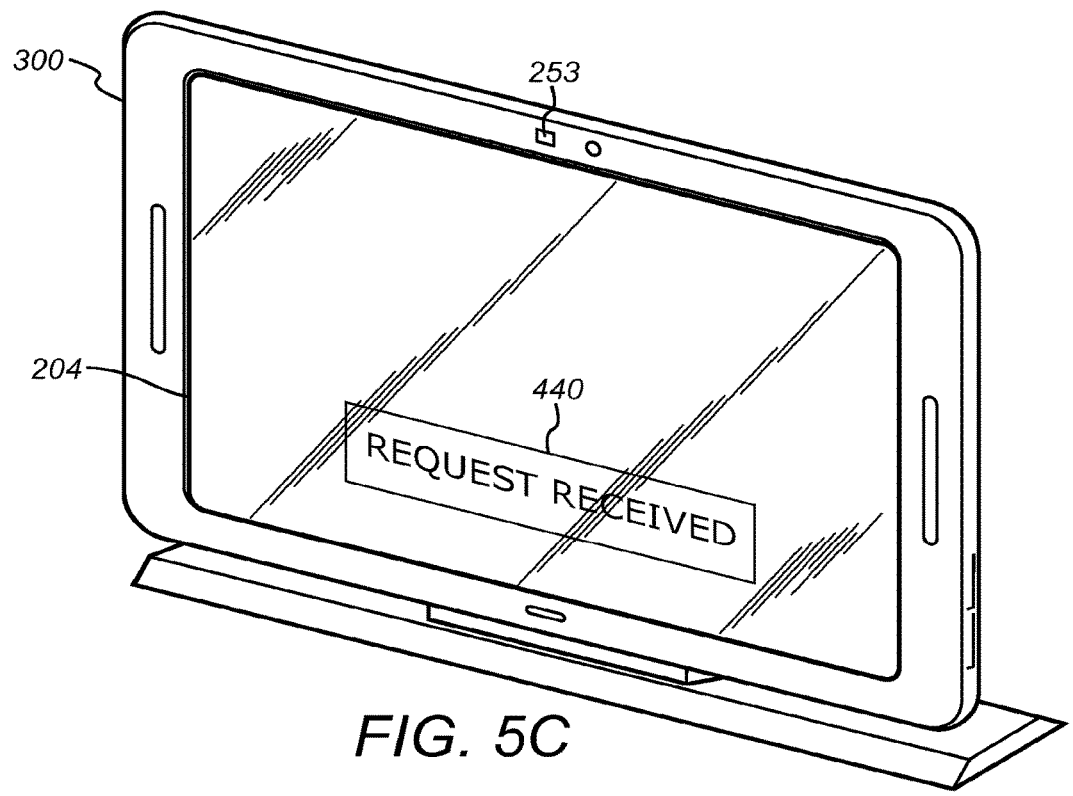

In block 510, the request and the data indicative of the gesture performed with the first device 100 are received at one or more second devices 300. FIG. 5C illustrates one of a plurality of second devices 300 that receives the request and the data. In this example, the processor 240 of the second device 300 illustrated in FIG. 5C provides data to the display 204 of the second device 300 to inform a user that a request has been received. For example, as illustrated, the second device 300 displays the message "Request received". It will appreciated that only a single device 300 is illustrated in FIG. 5C but more devices, within communicative range of the first device 100, may also receive the request, and will also display a similar message. The message is generated by the processor 240 of the respective second device 300 via an application, which allows folder sharing between devices and corresponds to a similar application executable on the first device 100 to allow folder sharing. The message informs the user of the first device 100 that the request from the first device 100 has been received and that it may be possible to share the selected folder with the device displaying the message once the sharing procedure is complete.

The message displayed on the second device 300 illustrated in FIG. 5C is a response to the request received from the first device 100, and in some examples, is only displayed if one or more criteria are met. These criteria comprise one or more of the first device and the second device having previously communicatively coupled to one another, the second device is available for communicatively coupling with the first device and the second device comprises a user account associated with the first device, or user thereof. It will be appreciated that other criterion may be used, as required.

If, for example, none of the criteria are met, the second device 300 may display a different message to inform the user of the first device 100 that a connection or communicative coupling with the device displaying the message is not possible.

In block 512, and in addition to outputting a message to the user, the processor 240 of the second device 300, in response to the received request, attempts to detect the gesture performed with the first device 100 using an appropriate input device. In this example, the video camera 253 is used, since the gesture performed is in a form of a visual signal performed with the first device 100. Data from the camera 253 is received by the processor 240 of the second device 300. The data received from the camera 253 is data indicative of the detected gesture performed with the first device 100. The detection of the gesture in this example is triggered or prompted by the receipt of the request from the first device 100. Accordingly, in this example, a user continues to perform the gesture with the first device 100 until prompted in some manner to stop, or if a predetermined time has lapsed, as discussed above. As for the first device 100, the processor 240 of the second device 300, also uses data obtained from available input sensors of the second device 300 to generate a model of the gesture, e.g. a 3D spatial model. The data generated by the processor 240 of the second device 300 is indicative of the gesture.

The processor 240 of the second device 300 compares the data indicative of the gesture received from the first device 100 with the data indicative of the gesture, detected at the second device 300. The comparison is performed to determine if the gesture is aimed at the respective second device 300. The matching of the gesture detected by the two devices 100, 300 is made by comparing the data (i.e., models) indicative of the gesture in a 2D or 3D space. A comparison between the two models is performed using, for example, a sweeping window/blob tracking or non-uniform rational basis spline (NURBS) looking at parameters such as positional, tangential and curvature continuity and time. The robustness of the comparisons may be improved when using tangential detection over time. A comparison of rotation and orientation may also be used but this form of analysis may exclude a tangent analysis as mentioned above. The various variables of the 3D model may have different significance or weight in the model, where time and position in a straight plane may rank higher than 3D depth, for example.

The comparison involves comparing the two sets of data to determine if they are the same or similar. For example, the comparison may involve determining if the two sets of data are similar within a predetermined accuracy or error, for example, 1, 2, 3, 4, 5, 6, 7, 8, 9, or 10%. If it is determined that the gesture data indicative of the gesture detected at the first device 100 is within a predetermined percentage or error, as above, of the gesture data indicative of the gesture detected at the second device 300 a positive determination is made and the gesture is deemed to be directed at the second device 300 detecting the gesture. In examples where there are multiple second devices receiving the request for a connection and detecting the gesture performed with the first device 100, each of the second devices may communicate with each other to transmit the data indicative of the gesture generate therein. In the example where multiple devices receive the coupling request, each device generates data indicative of the gesture, and communicates the data indicative of the detected gesture to each of the other second devices in the network. Thus, each second device can compare the data generated at all second devices receiving the coupling request to determine which of the second devices is closest to, or in proximity to, the first device 100. In this example, the second device that has the closest match between the data indicative of the gesture performed at the first device 100 and the data indicative of the gesture detected at the plurality of second devices is chosen for making the communicative coupling from amongst the other second devices receiving the coupling request.

Figure 5D:
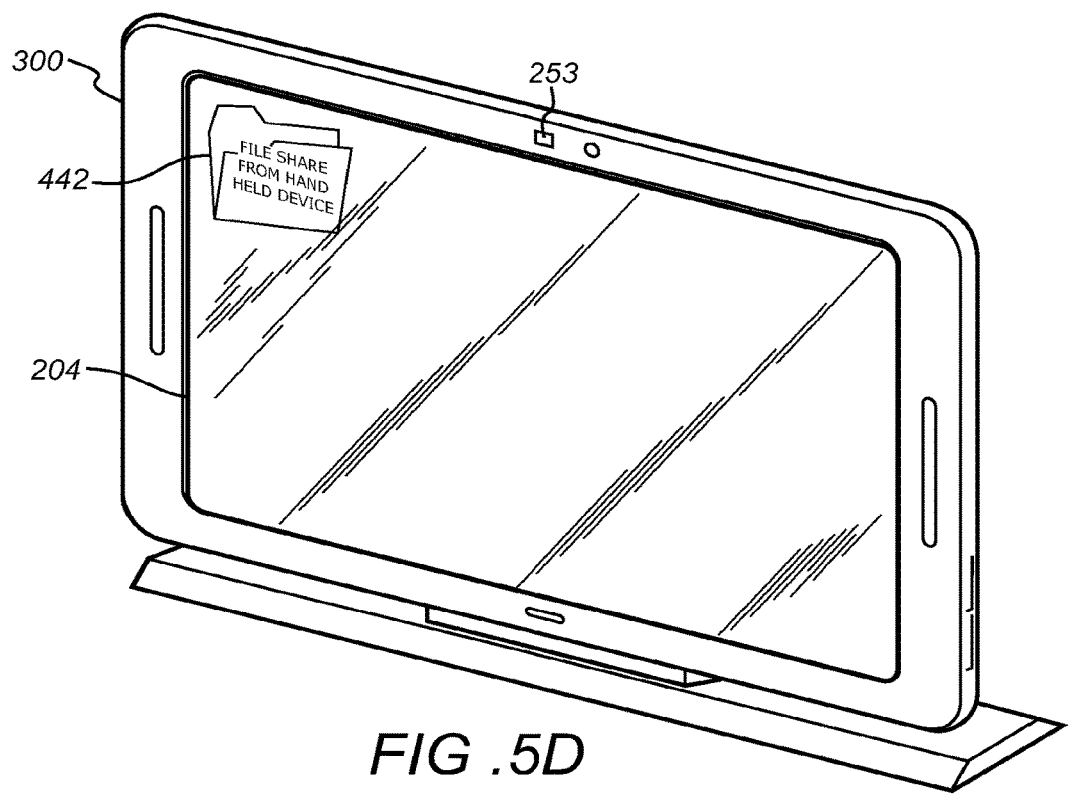

In block 514, a determination is made that the gesture is directed at the second device 300 illustrated in FIG. 5D (i.e., a positive comparison is made). It will be appreciated that at the same time one or more other second devices (not shown) perform the same comparison and determine that the gesture is not being directed thereto. Accordingly, the one or more other second devices 300 take no further action in respect of the connection request. Furthermore, the one or more other second devices 300 may also remove the displayed message once it is determined that the gesture is not directed thereto.

In block 516, and in response to the positive comparison performed in block 514, the processor 240 of the second device 300 outputs a response or message to the first device 100 to allow the folder share. Allowing the folder share includes, in this example, providing a selectable display icon (or notification) 442, or image representative of a folder share for display on the display 204 of the second device 300, which when selected by a user at the second device 300 provides access to the pre-selected folder of the first device 100. This is achieved by providing a data connection between the two devices that provides access to the contents of the selected folder. Alternatively, the contents of the entire selected folder may be copied to the second device 300 in block 516. In the example of a user selecting a single file to share, the file may be copied to the second device 300, for example. In an alternative example, the processor 240 of the second device 300 outputs a response to the first device 100 to allow the folder share, and receives back from the processor 240 of the first device 100 details of the folder or files to be shared.

As described above, the user may continue to perform the gesture with the second device until prompted to stop. The display of the selectable icon 442 may be considered be an example prompt to the user to stop performing the gesture. Alternatively, a further notification may be displayed at the second device 300 to inform the user to stop performing the gesture, or the first or second devices 100, 300 may emit a sound via speakers 256 to inform the user to stop performing the gesture. If a negative comparison is made in block step 514 by one or more second devices 300 or if a connection cannot be established, since none of the above-mentioned criteria are met, the second device may provide a display or notification to inform the user that the requested folder share is not possible. Alternatively, the first device 100 may emit a sound or provide a notification to indicate to the user that a connection cannot be established.

Thus a user is able to perform a predetermined gesture with a first electronic device 100 in proximity to a second electronic device 300, to which he wishes to transfer data, and a connection is established and the data is transferred without further input from the user.

Figure 8:
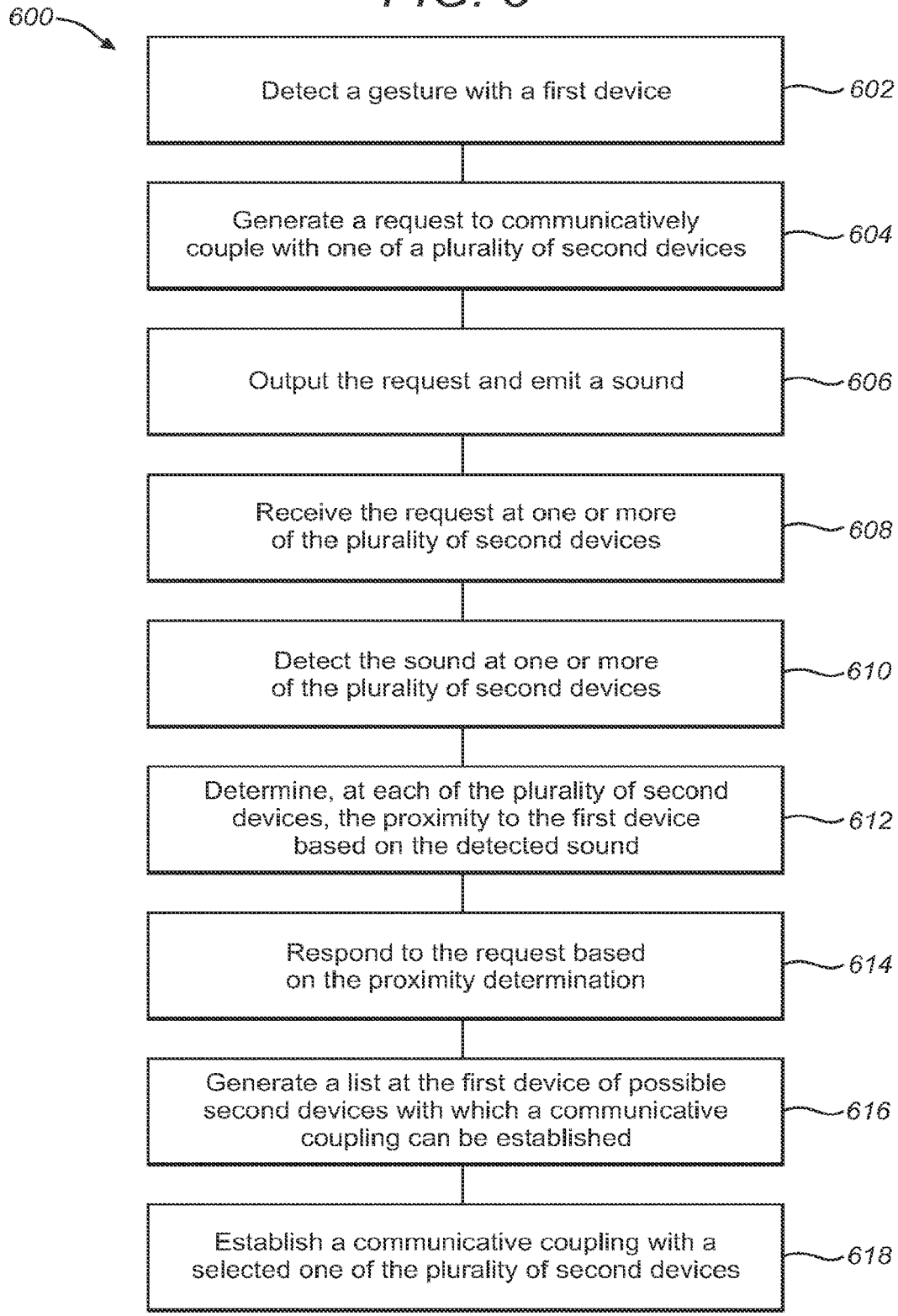
FIG. 8 is a flow chart depicting a method performed in association with the first and second devices illustrated in FIGS. 7A to 7B.

FIGS. 7A to 7B are now used in conjunction with a flow chart 600 illustrated in FIG. 8 to illustrate a mode of operation in accordance with a further embodiment of the invention. It is noted that the steps illustrated in flow chart 600 may be performed in a different order and one or more steps may be optionally performed.

In block 702 of flow chart 600, a user selects a file to share with a second device on which the user intends to work on or interact with. This is similar to block 502 described above in association with flow chart 500. Once a file is selected by a user, the processor 240 of the first device 100 generates data for a display on the display 204 of the first device 100 to shake the device to share the folder, for example. A "shake" gesture 452 performed with the first device 100 is illustrated in FIG. 7A. The gesture 452 performed with the first device 100 is detected by one or more of the orientation sensors 251 (e.g., gyroscope or accelerometer) of the first device 100. The processor 240 of the first device 100, which is coupled to the orientation sensors 251 generates data indicative of the detected gesture (e.g., a 3D model of the gesture). The data indicative of the detected gesture comprises, for example, a distance moved, a velocity of the movement, an angle of rotation and a distance of rotation. The data indicative of the gesture 452 is used by the processor 240 of the first device 100 to determine if the gesture performed is the predetermined gesture associated with file or data sharing, or establishing a connection. The gesture is performed by a user in proximity to one of a plurality of second devices 300 with which the user wishes to share the data.

In block 704, the processor 240 of the first device 100 generates data indicative of a request to share the selected data file with a plurality of second devices 300. It will be appreciated that ultimately the file will only be shared with a single device but the request to share the data file will not be specific to a second device. The request is in the form of a broadcast to all devices within communicative range of the first device 100. That is to say that in this example the request is not addressed to a specific second electronic device, remote from the first device 100. Rather the request is made to a plurality of devices within communicative range of the first device 100. The request contains data related to the first device 100, e.g., identification and connection type, and includes details of the data to be shared. In this example, the first device 100 and a plurality of second devices 300*a*, 300*b*, 300*c* are illustrated in FIG. 7A. In the figure each of the second devices 300*a*, 300*b*, 300*c* are illustrated with nothing displayed 450*a*, 450*b*, 450*c* on their respective displays 204*a*, 204*b*, 204*c* to indicate that each of the second devices 300*a*, 300*b*, 300*c* are currently in a sleep, or hibernation mode. That is to say that the second devices 300*a*, 300*b*, 300*c* are active, but at least the displays 204*a*, 204*b*, 204*c* are not active.

In block 606, the first device 100 outputs the request and at the same time emits a sound 454. In this example, the emitted sound, emitted by speakers 256 of the first device 100, is inaudible (i.e., the sound is emitted at a frequency outside of the hearing range of a typical human), but audible sounds could equally be emitted. The request is output in a packet format as a broadcast, as is typical in the art, over a short-range radio frequency link, for example, Bluetooth or via a data network (e.g., Wi-Fi using IEEE 802.11 radio standards wireless network). As discussed above, it is assumed in this example, that the first device 100 has previously established a communicative link with one or more second devices, such that the request data is output as a broadcast to those second devices with which a previous communicative link has been established. However, it will be appreciated that the first device 100 may also output the request, in response to detected gesture 452, to other second devices that are in communicative range, but with which a connection has not been previously made, as discussed further below. It will be appreciated that the sound is emitted for a time period after the request is output by the first device 100 to allow the second devices 300 to detect the emitted sound after the request is output and received. For example, the sound 454 is emitted by the first device 100 for a period of, for example, 1, 2, 3, 4, 5, 10, 15, 20, 25, 30, 35, 40, 45, 50, 55 or 60 seconds after the request has been output.

In block 608, the request data to establish a communicative coupling, and share the user-selected file, is received by each of the second devices 300*a*, 300*b*, 300*c* illustrated in FIG. 7A, which correspond to devices with which the first device 100 has been previously established a connection. That is to say that the request is output to a plurality of second devices 300 and each of the plurality of second devices 300 receive the request. In response to receiving the request, the processor 240 of each of the second devices 300 recognises the request as a sharing request via an application running on the respective processor 240 and outputs a response. In this example, the response of each of the second devices 300*a*, 300*b*, 300*c* is to wake-up or come out of hibernation, which in the example illustrated in FIG. 7B, causes each of the displays 204*a*, 204*b*, 204*c* of the respective second device devices 300*a*, 300*b*, 300*c* to be turned-on. This is illustrated in FIG. 7B by a home screen 460*a*, 460*b*, 460*c* being displayed. The display of the home screen 460*a*, 460*b*, 460*c* indicates to the user that the request is received. This indication may also be used to prompt the user to stop performing the gesture 452. As described above, the sound may still be emitted from the first device 100 for a predetermined time after the user stops performing the gesture with the first device 100.

In block 610, each of the second devices 300*a*, 300*b*, 300*c* detect the emitted sound via their respective speakers 256*a*, 256*b*, 256*c*.

In block 612, each of the second devices 300*a*, 300*b*, 300*c* determine the location of the first device 100 based on the detected sound. In this example, this is achieved by each of the second devices 300*a*, 300*b*, 300*c* communicating with each other to transmit data indicative of the intensity or signal strength of the detected sound. It is assumed that each of the second devices is on the same network and thus is able to communicate easily with one another. Once each of the second devices 300*a*, 300*b*, 300*c* has received the data indicative of the intensity or signal strength of the detected sound from the other second devices, each of the second devices is able to determine which of the second devices 300*a*, 300*b*, 300*c* is in close proximity to, or closest to, the first device 100. The second device 300*a*, 300*b*, 300*c* in close proximity to, or closest to, the first device 100 is assumed to be the second device with which the user would like to communicatively couple his electronic device (i.e., the first electronic device 100).

In block 614, in one example, the second device deemed closest to the first device 100 outputs data to the first device 100 to establish the connection and transfer the selected data file. In this example, second device 300*b* is deemed to be the closest device to the first device 100, since the detected intensity or signal strength of the emitted sounds is greatest or greater than detected at the other two second devices 300*a*, 300*c* illustrated. The data output may be an acknowledgment to connect, such that the first device 100 transfers the selected file. In an alternative example, all the devices respond to the emitted sound by outputting data indicative of their respective relative proximity or distance to the first device 100, or the detected intensity or signal strength of the sound emitted by the first device 100. For example, if it not possible to determine the closest second device to the first device, the user may be provided with a choice of possible second devices, as described in association with blocks 616 and 618. It will be appreciated that triangulation based on the detected intensity or signal strength of the sound emitted may also be used to determine the relative location of the first device 100 with respect to the second devices 300*a*, 300*b*, 300*c*. Triangulation may also be performed with a single second device 300 which may incorporate two microphones separated by a predetermined distance. For example, the determination of the closest second device 300 to the first device 100 may be determined by each of the second devices 300*a*, 300*b*, 300*c*, or may be determined by the first device 100 upon receipt of data indicative of the detected intensity or signal strength of the sound emitted by the first device 100 detected at each of the second devices 300*a*, 300*b*, 300*c*.

In block 616, the processor of the first device 100 generates a list for display on the display 204 of the first device 100, where the displayed list is a list of possible second devices with which a connection may be established. The list is generated based on the data received from the second devices 300a, 300b, 300c. The list may be ranked based on the data received from the respective second devices 300a, 300b, 300c indicative of relative proximity or distance to the first device 100, or the detected intensity or signal strength of the sound emitted by the first device 100 and detected by the second devices 300a, 300b, 300c. As illustrated in FIG. 7B the list is ranked with second device 300b at the top followed by second device 300a, and second device 300c, since based on the detected signal intensity data received from each of the second devices 300a, 300b, 300c, the second device 300b is deemed to be closest to the first device 100 when the gesture is performed. The list is typically provided if it is not possible to determine with which of the second devices a connection should be established.

In block 618, a communicative coupling between the first device 100 and the second device 300b is established, such that the first device 100 transfers the selected file to the second device 300b, based on a user selection from the list illustrated in FIG. 7B. The display 204b of the second device 300b may also include one or more of a message, icon and notification that a connection is established and the transfer is complete. It will be appreciated that once the communicative coupling or link is established, the user may more easily transfer further files or data without performing the gesture. As described in association with block 614, the closest second device may be determined without intervention from the user, such that the connection is established and the selected file transferred without further input from the user. Accordingly, the user is able to establish a connection, and optionally transfer a data file by performing a predetermined gesture in proximity to a second device with which a connection is desired.

It will be appreciated that it is not necessary to select a file or data for transfer or sharing. In an alternative example, a user performs the predetermined gesture in proximity to a second device 300b when a connection is desired, and the steps of outputting a request and a sound are still performed, and once the closest second device 300b is determined, as described above, the connection or communicative coupling is established. The user may be provided with a message or notification on one or both the first and second devices 100, 300b, to indicate the connection has been established. Thus when the user interacts with the desired second device 300b data from the first device 100 can be accessed.

In a further example, and as discussed above, one of the criteria for establishing a connection is whether the user of the first device 100 has a user account on the desired second device 300. In this example, the request from the first device 100 comprises data related to the user and in addition to establishing a connection to allow a collaboration of the first device 100 with a desired second device 300, the second device 300 is also unlocked to allow the user access to the desired second device without entering a username and password, for example. That is to say that access to an account of a user is permitted on the second device 300 if it is determined that the second device 300 comprises a user account associated with the first device 100.

In the examples described above, sound emitted from the first device 100 is used to determine the location of the first device 100 with respect to the second devices 300. In alternative embodiments visible light or other light in the electromagnetic spectrum may be used in a similar manner, where the intensity of the light detected at the second device 300 is used to determine the location of the first device 100 with respect to one or more second devices 300. In a further example, the signal strength of the Wi-Fi signal may be used in a similar manner to the emitted sound. It will be appreciated that other forms of electromagnetic radiation may also be outputted or emitted by the first device 100, in addition to or, as part of the carrier signal of the request data (e.g., the Wi-Fi carrier signal). In addition to outputting light, a pattern may be displayed on the display 204, generated by the processor 240 of the first device, for detection by one or more second devices 300 to determine the location of the first device 100 with respect to the second devices 300. For example, the data indicative of the display pattern may be outputted to the second device 300 with the connection request to allow the respective second device 300 to detect the pattern using the camera 253, for example, and compare the detected image with the data indicative of the pattern received by the second device 300 from the first device 100, as described above.

In the example of using the signal strength of the received Wi-Fi signal it will be appreciated that the request to establish the communicative coupling is comprised in the signal. Thus, a signal is outputted by the first device 100 over the wireless network in the form of a request, and the strength or relative strength of the signal is used to determine if the performed gesture is directed at the second device 300 receiving the signal request. Furthermore, multiple signal strengths may be used to determine the location of the first device with respect to one or more second devices. For example, the strength of an emitted sound and the signal strength of the Wi-Fi signal received at a second device 300 may be used in combination to more accurately predict the location of the first device 100 relative to one or more second devices.

In the examples described herein, a response is output by the second device 300 indicative that the second device 300 is available for communicative coupling. The response from the second device 300 may be, for example, one or more of a displayed image, icon and notification displayed on the display 204 of the second device 300. The response may also be in the form of an audible response emitted from the speakers 256 of the second device 300. In further examples, the response is outputted from the second device 300 to the first device 100 to acknowledge that a communicatively coupling is possible or is established. If a response is outputted to the first device 100, the response is in the form of a data packet containing data indicative of instructions to complete the establishment of the connection or communicative coupling between the first and second devices 100, 300. For example, in response to the receipt of the data indicative of instructions to complete the establishment of the connection from the second device 300, the first device 100 outputs, to the second device 300, data related to the previously established Wi-Fi connection, for example.

The response output by the processor 240 of the second device 300 may be, for example, an instruction to allow the first electronic device 100 to transfer data, e.g., a preselected data file, from memory of the first electronic device 100 to memory of the second electronic device.

In the examples described herein it is assumed that a connection has been previously established with a second device. However, as described above the request to establish a connection may still be output to other devices with which a previous connection has not been established. In this example, any devices with which a previous connection has not previously been established may simply ignore the request, or request that the first device 100 or user thereof, first sets up an account to allow a connection to be established. Furthermore, in response to the request to establish a connection output by the first device 100, all devices that are within range could respond (irrespective if a previous connection has been established or if a user account exists on the further device), such that a list of all possible devices can be generated at the first device 100 for user selection.

Specific or predetermined gestures have generally been described herein, but it will be appreciated that any 2D or 3D gesture may be performed by a user with the first electronic device 100. For example, if a user would like to connect to a second electronic device 300, he may be asked, by the first device 100, to perform a gesture with his device in proximity to a second device 300 with which he wishes to connect. This gesture can be any movement performed with first device 100 that allows the movement to be detected, as described above, and data indicative of the gesture to be outputted by the first device 100 to one or more second devices 300.

Figure 9:
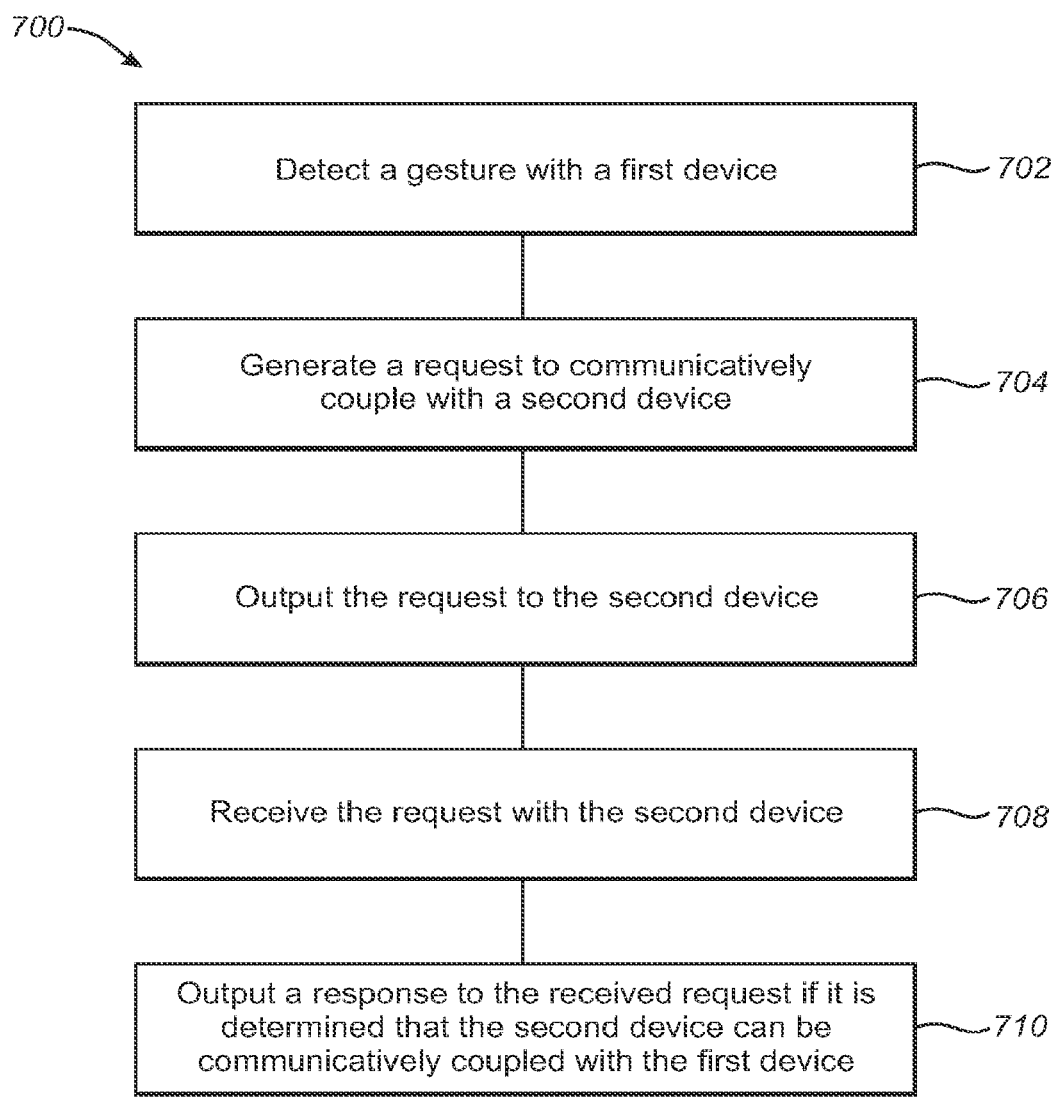
FIG. 9 is a flow chart depicting a method performed in association with the first and second devices.

FIG. 9 is a flow chart depicting a method 700 performed by the processor 240 of a first electronic device 100 and the processor 240 of a second electronic device 300, as described in association with FIGS. 5A to 7B. Each of the processors 240 of the first and second devices 100, 300 are functionally similar processor, and are provided by two different physical devices. The processors 240 may comprise one or more processing circuits configured to perform the methods described herein and the one or more processing circuits may comprise one or more discrete electronic components. It will be appreciated that the steps of the flow chart 700 may be performed in a different order then depicted and one or more steps may be optionally performed.

In block 702, the processor 240 of the first electronic device 100 detects a gesture performed with the first electronic device 100 via one or more input devices, e.g., one or more of a motion sensor, an accelerometer and a gyroscope, coupled to the processor 240 of the first device 100.

In block 704, the processor 240 of the first electronic device 100 generates a request to communicatively couple with a second electronic device 300. For example, the request may be in the form of a data packet indicative of a request comprising data on the first electronic device 100 and connection settings of the first electronic device 100.

In block 706, the processor 240 of the first electronic device 100 outputs the request to the second electronic device 300.

In block 708, the processor 240 of the second electronic device 300 receives the request from the first electronic device 100 to establish a communicative coupling. For example, the request comprises data indicative of a request to establish a connection using a previously established Wi-Fi connection.

In block 710, the processor 240 of the second electronic device 300 outputs a response if it is determined that a communicative coupling, or connection, can be established between the first and second electronic devices 100, 300. For example. The processor 240 of the second device determines if a connection has been previously established with the first electronic device 100, and if a positive determination is made outputs an acknowledgment to the first electronic device 100 to complete the coupling or connection. Additionally, the second electronic device 300 may also generate a display on the second electronic device 300 to acknowledge that a request is received to inform the user that the request was successfully received.

In the flow chart 700 illustrated in FIG. 9 the first electronic device 100 may not generate and output data indicative of the gesture, as described above. In an example mode of operation, the second electronic device 300 has stored therein (e.g., in memory 246) data indicative of one or more gestures (e.g., models). These, predetermined, gestures are associated with connection requests. When the gesture is performed with the first electronic device 100, and the request to communicatively couple with the second electronic device 300 is received by the second electronic device 300, the second electronic device 300 detects the gesture performed with the first electronic device 100, as described above. As described above the processor 240 of the second electronic device 300 generates a 3-D model, for example, representative of the gesture performed with the first electronic device 100. The processor 240 of the second electronic device 300 compares the generated model with the stored model. If a positive comparison is obtained, as described above, the processor 240 of the second electronic device 300 outputs a response that a communicative coupling, or connection, can be established between the first and second electronic devices 100, 300, as in block 710. If a negative comparison is obtained (i.e., the detected gesture is not deemed to be similar to one of the one or more gestures stored at the second electronic device 300), a response to establish a communicative coupling is not output to the first electronic device 300.

While the present application is primarily described in terms of devices and methods (e.g., first and second devices 100, 300), the devices may include components for performing at least some of the example aspects and features of the described methods, be it by way of hardware components (such as the memory 244, 246, 248 and/or the processor 240), software or any combination of the two, or in any other manner. Moreover, an article of manufacture for use with the apparatus, such as a pre-recorded storage device or other similar computer readable medium including program instructions recorded thereon may direct the apparatus to facilitate the practice of the described methods. It should be understood that such apparatus and articles of manufacture come within the scope of the present application.

The term "computer readable medium" as used herein means any medium which can store instructions for use by or execution by or on a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

It will be appreciated that the foregoing discussion relates to particular embodiments. However, in other embodiments, various aspects and examples may be combined.

The invention claimed is:

1. A method of operating a first electronic device, the method comprising:
    detecting at a first electronic device a gesture performed at the first electronic device using one or more input devices coupled to the first electronic device; and
    outputting from the first electronic device, in response to the detecting the gesture, an activation signal to initiate communication with a second electronic device, the activation signal comprising data indicative of the gesture being detected at the first electronic device and a request to initiate communication between the first electronic device and the second electronic device, wherein the second electronic device outputs a response based on the second electronic device: detecting the gesture performed at the first electronic device using one or more input devices coupled to the second electronic device, generating data indicative of the gesture detected using the one or more input devices coupled to the second electronic device, and having stored, in advance of the performed gesture, data indicative of a predetermined gesture that matches the generated data.

2. The method of claim 1, further comprising receiving the response from the second electronic device indicative that the second electronic device is available for communicative coupling.

3. A method of operating a second electronic device, the method comprising:
receiving, at the second electronic device, an activation signal to initiate communication between a first electronic device and the second electronic device, the activation signal comprising data indicative of a gesture being performed and detected at the first electronic device using one or more input devices coupled to the first electronic device and a request to initiate communication between the first electronic device and the second electronic device based on the second electronic device: detecting the gesture performed at the first electronic device using one or more input devices coupled to the second electronic device, generating data indicative of the gesture detected using the one or more input devices coupled to the second electronic device, and having stored, in advance of the performed gesture, data indicative of a predetermined gesture that matches the generated data; and
outputting from the second electronic device a response to the received request if the second electronic device determines that the stored data indicative of a predetermined gesture matches the generated data.

4. The method of claim 3, wherein the outputting from the second electronic device comprises outputting data for display at the second electronic device.

5. The method of claim 4, wherein the outputting from the second electronic device comprises generating a message on a display of the second electronic device to inform that the request was successfully received.

6. A non-transitory computer-readable medium comprising computer executable instructions which, when executed by processing circuitry, cause the processing circuitry to:
detect at a first electronic device a gesture performed at the first electronic device using one or more input devices coupled to the first electronic device; and
output from the first electronic device, in response to the detecting the gesture, an activation signal to initiate communication with a second electronic device, the activation signal comprising data indicative of the gesture being detected at the first electronic device and a request to initiate communication between the first electronic device and the second electronic device, wherein the second electronic device outputs a response based on the second electronic device: detecting the gesture performed at the first electronic device using one or more input devices coupled to the second electronic device, generating data indicative of the gesture detected using the one or more input devices coupled to the second electronic device, and having stored, in advance of the performed gesture, data indicative of a predetermined gesture that matches the generated data.

7. A non-transitory computer-readable medium comprising computer executable instructions which, when executed on processing circuitry, cause the processing circuitry to:
receive, at a second electronic device, an activation signal to initiate communication between a first electronic device and the second electronic device, the activation signal comprising data indicative of a gesture performed and detected at the first electronic device using one or more input devices coupled to the first electronic device and a request to initiate communication between the first electronic device and the second electronic device based on the second electronic device: detecting the gesture performed at the first electronic device using one or more input devices coupled to the second electronic device, generating data indicative of the gesture detected using the one or more input devices coupled to the second electronic device, and having stored, in advance of the performed gesture, data indicative of a predetermined gesture that matches the generated data; and
output from the second electronic device a response to the received request if the second electronic device determines that the stored data indicative of a predetermined gesture matches the generated data.

8. An electronic device being a first electronic device comprising processing circuitry configured to perform a method of:
detecting at the first electronic device a gesture performed at the first electronic device using one or more input devices coupled to the first electronic device; and
outputting from the first electronic device, in response to the detecting the gesture, an activation signal to initiate communication with a second electronic device, the activation signal comprising data indicative of the gesture being detected at the first electronic device and a request to initiate communication between the first electronic device and the second electronic device, wherein the second electronic device outputs a response based on the second electronic device detecting the gesture performed at the first electronic device using one or more input devices coupled to the second electronic device, generating data indicative of the gesture detected using the one or more input devices coupled to the second electronic device, and having stored, in advance of the performed gesture, data indicative of a predetermined gesture that matches the generated data.

9. An electronic device being a second electronic comprising processing circuitry configured to perform a method of:
receiving, at the second electronic device, an activation signal to initiate communication between a first electronic device and the second electronic device, the activation signal comprising data indicative of a gesture performed and detected at the first electronic device using one or more input devices coupled to the first electronic device and a request to initiate communication between the first electronic device and the second electronic device based on the second electronic device: detecting the gesture performed at the first electronic device using one or more input devices coupled to the second electronic device, generating data indicative of the gesture detected using the one or more input devices coupled to the second electronic device, and having stored, in advance of the performed gesture, data indicative of a predetermined gesture that matches the generated data; and
outputting from the second electronic device a response to the received request if the second electronic device determines that the stored data indicative of a predetermined gesture matches the data generated data.

* * * * *